United States Patent [19]

Grey et al.

[11] Patent Number: 4,832,553
[45] Date of Patent: May 23, 1989

[54] APPARATUS FOR LOADING AND PALLETIZING BOXES AND CARTONS, ESPECIALLY FROM AN AGRICULTURAL FIELD

[75] Inventors: Donald M. Grey, 12739 S. Bethel, Selma, Calif. 93662; Lee D. Butler, Kingsburg, Calif.

[73] Assignee: Donald Martin Grey, Selma, Calif.

[21] Appl. No.: 775,654

[22] Filed: Sep. 12, 1985

[51] Int. Cl.$^4$ .......................................... A01D 87/00
[52] U.S. Cl. ................................ 414/789.7; 198/512; 414/111; 414/343; 414/505; 414/528; 414/902; 414/792; 414/788
[58] Field of Search ............... 414/28, 44, 902, 110, 414/345, 111, 343, 62, 502, 503, 504, 505, 528; 198/512

[56] References Cited

U.S. PATENT DOCUMENTS

| | | | |
|---|---|---|---|
| 1,166,083 | 12/1915 | Russell | 198/512 X |
| 2,397,570 | 4/1946 | Smoker | 198/512 X |
| 2,870,922 | 1/1959 | Thomson | 414/902 X |
| 3,549,023 | 12/1970 | Backman | 414/902 X |
| 3,690,473 | 9/1972 | Miguel | 414/44 |
| 4,247,239 | 1/1981 | Miguel | 414/44 |
| 4,355,713 | 10/1982 | Adam | 198/514 |
| 4,604,018 | 8/1986 | Kruse | 414/44 |

FOREIGN PATENT DOCUMENTS 1082024  9/1967  United Kingdom ................ 198/512

*Primary Examiner*—Frank E. Werner
*Assistant Examiner*—Janice Krizek
*Attorney, Agent, or Firm*—Shlesinger, Arkwright & Garvey

[57] ABSTRACT

Disclosed is a method and apparatus for lifting and stacking cartons onto a bed attached to a truck bed, especially in an agricultural field. The lifting apparatus includes two endless parallel belts to lift the cartons from the field onto a first conveyor. Variations in carton size or alignment may be accommodated by a pivoting loading frame or by lateral movement of the loader, which lateral movement is compensated for by a self-alignment mechanism. Cartons are transported to an elevator via a first and second conveyor. The elevator lifts the cartons to the level of a palletizer with a false floor wherein a reciprocating and pivoting transfer head removes the cartons from the elevator and deposits them onto the prestacking area of the palletizer false floor. Cartons may be selectively rotated into a transverse loading position by the transfer heads. Upon assembly of a first row of cartons, a tamping bar extends to position the cartons against the truck tailgate or against previously stacked cartons. Upon assembling additional rows of cartons onto the prestacking area, thereby completing a full section of cartons, the tamping bar extends while the false floor retracts, thereby depositing the section of cartons onto the truck bed in the desired configuration. The palletizer moves longitudinally along the truck bed via a carriage. Removal of assembled cartons from the truck bed is accommodated through longitudinal movement of the carriage.

23 Claims, 38 Drawing Sheets

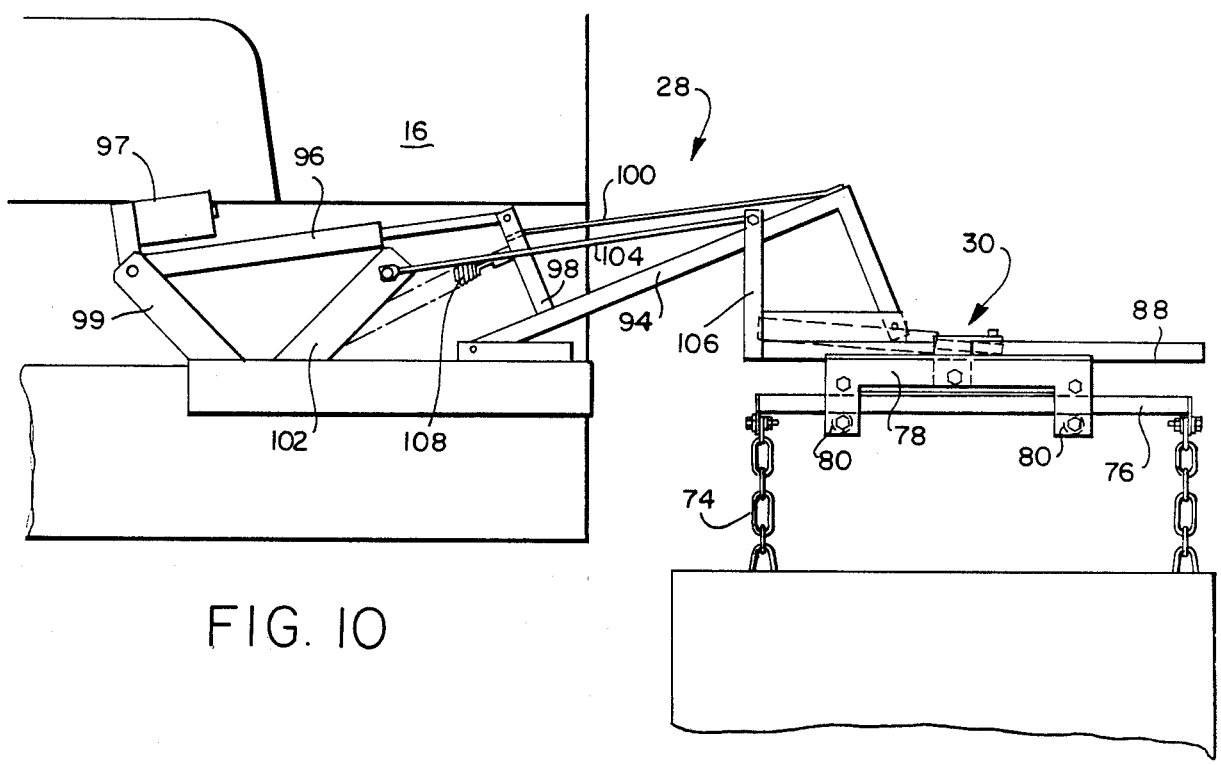
FIG. 10
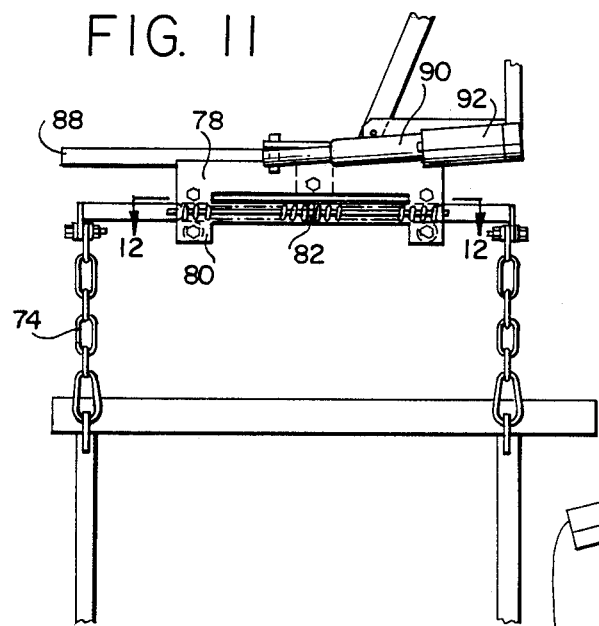
FIG. 11
FIG. 12
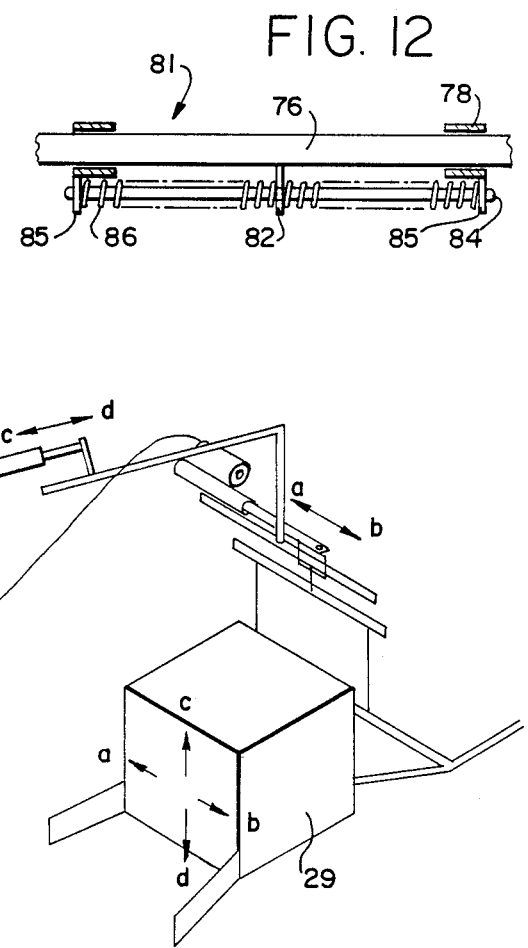
FIG. 13

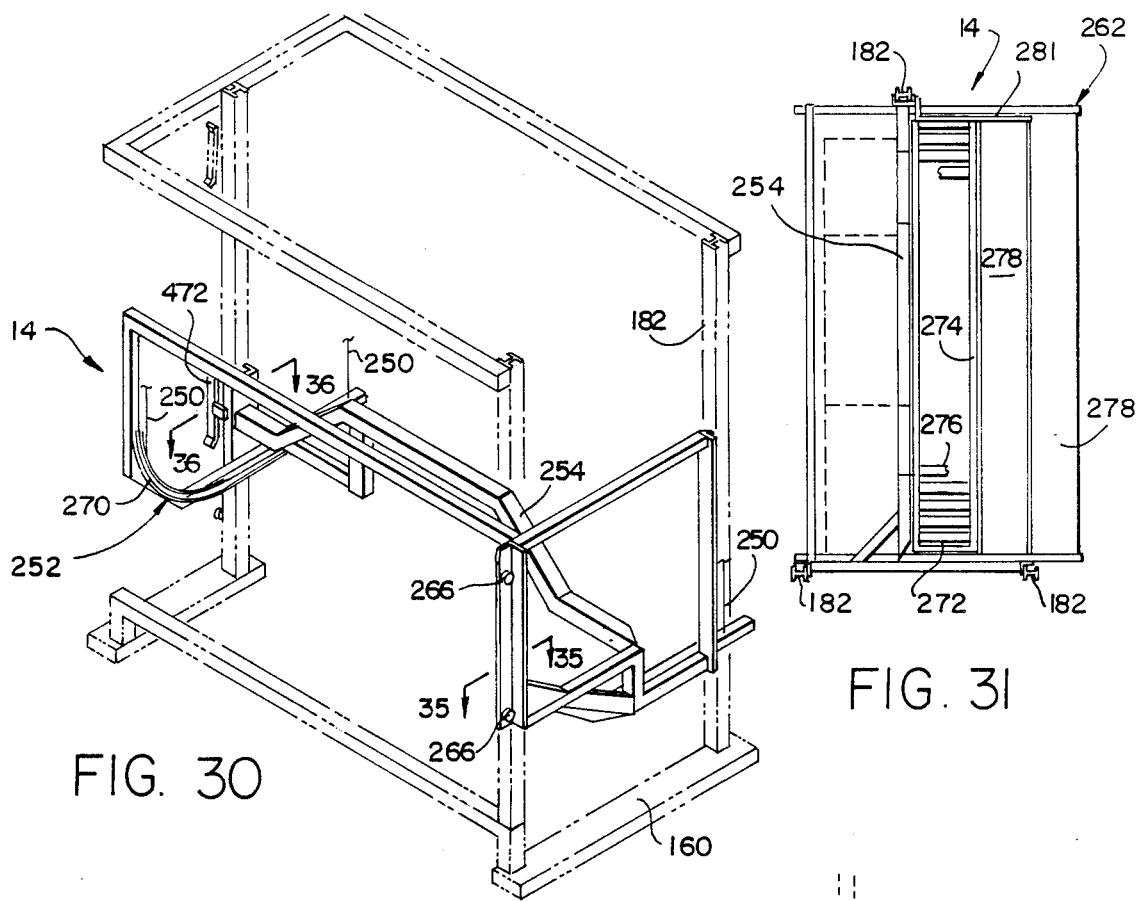
FIG. 30
FIG. 31
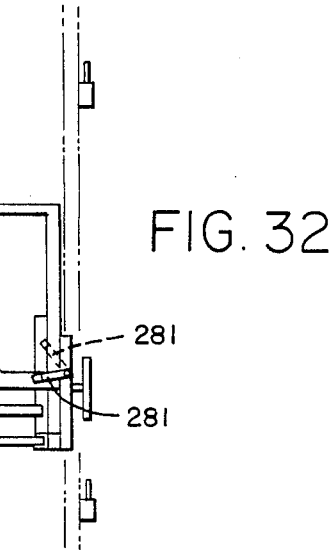
FIG. 32
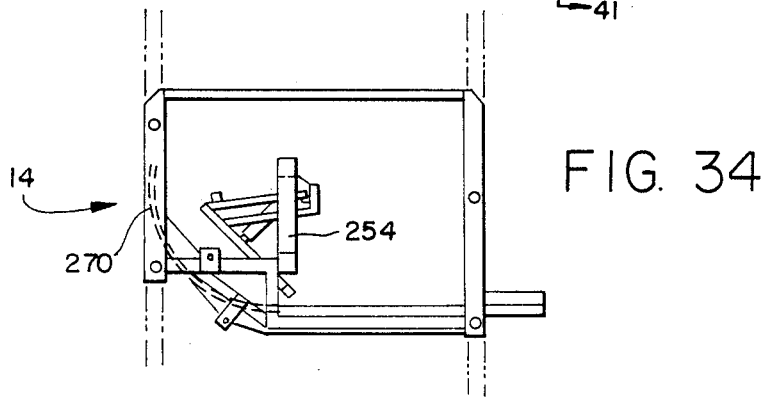
FIG. 34

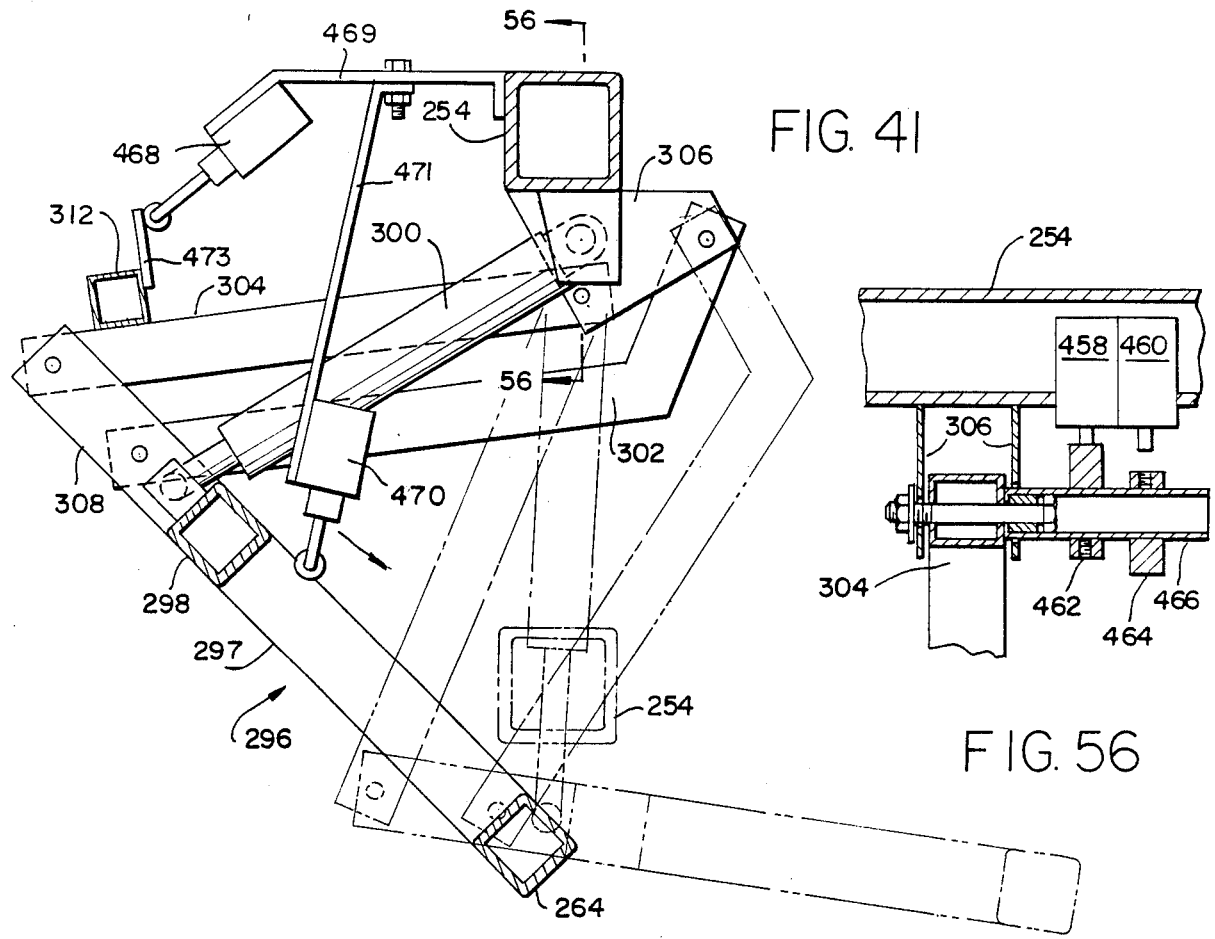
FIG. 41
FIG. 56
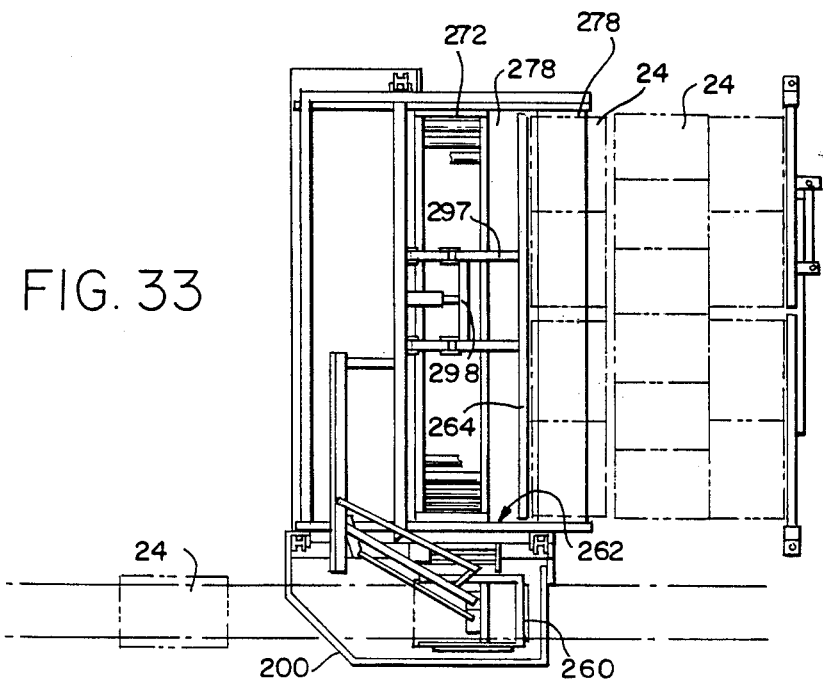
FIG. 33

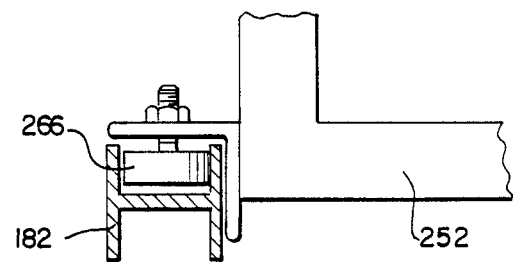
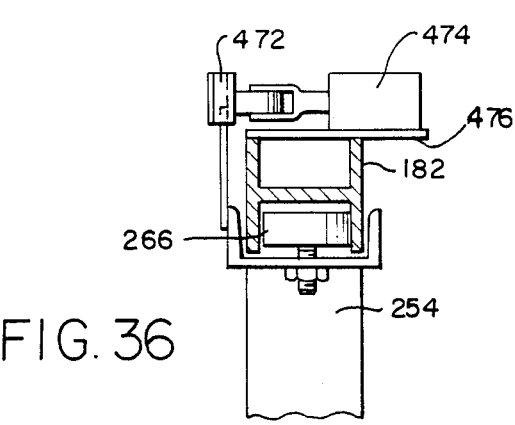
FIG. 36    FIG. 35
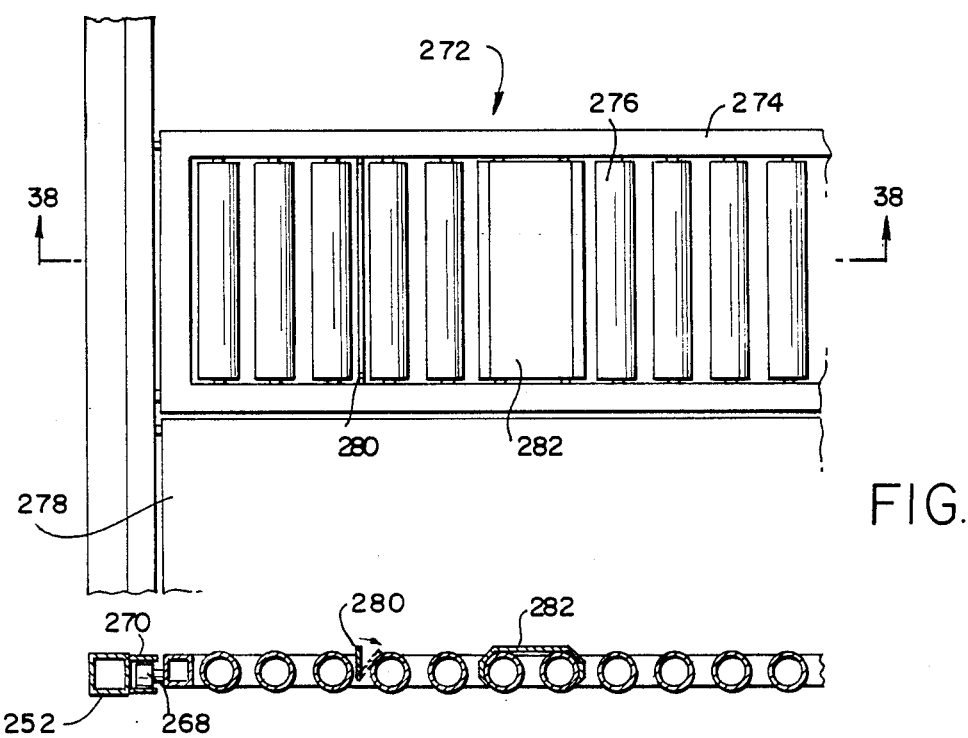
FIG. 37
FIG. 38

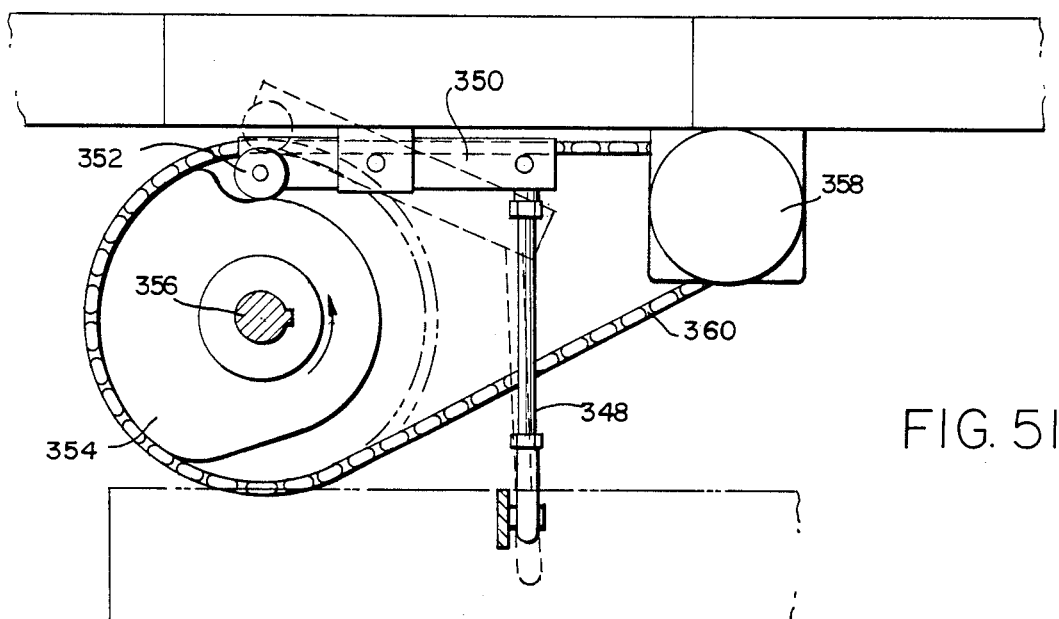
FIG. 51
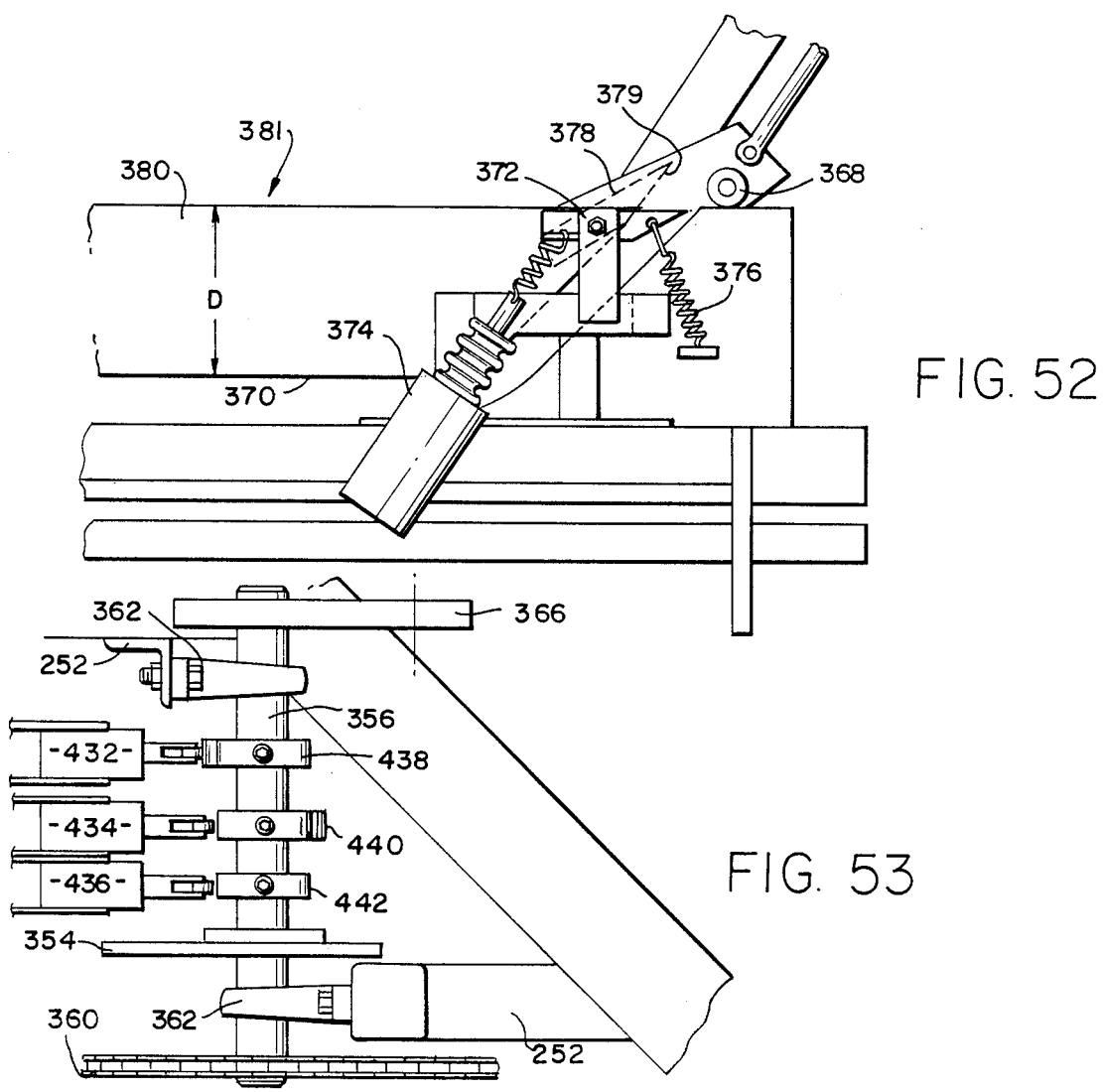
FIG. 52
FIG. 53

TRANSLOADER  COOLER

PLC OUTPUTS

| NW. NO. | COIL | FUNCTION |
|---|---|---|
| 12 | 001 | PALLETIZER DOWN |
| 12 | 002 | PALLETIZER UP |
| 12 | 003 | ELEVATOR ON |
| 15 | 004 | CARRIAGE FWD |
| -- | 005 | CARRIAGE AFT (NOT USED) |
| 13 | 006 | ROTATE ON |
| 2 | 007 | ELEVATOR SLOW DOWN |
| 13 | 008 | TRANSFER ON |
| -- | 009 | - |
| 11 | 010 | BAR OUT |
| 10 | 011 | BAR HOME |
| 10 | 012 | FLOOR RETRACT |
| 10 | 013 | FLOOR HOME |
| -- | 014 | - |
| 3 | 015 | LAYER BOX COUNT |
| 3 | 016 | LAYER BOX COUNTER RESET |

FIG. 76

PLC INTERNAL COILS

| NW. NO. | COIL | FUNCTION |
|---|---|---|
| 1 | 017 | FULL AFT READY TO MOVE FWD TO LOC. CAM |
|  | 018 | – |
| 1 | 019 | PADDLE READY OFF AFTER 1004 & DELAY |
| 3 | 020 | ELEVATOR ENABLE (ARM CLEAR OR SLOW DELAY) |
|  | 021 |  |
| 17 | 022 | NEXT TO LAST BOX & PALLET. FULL |
| 2 | 023 | LAYER CHANGE COMPLETE |
| 3 | 024 | LAST BOX DELIVERED ON LAYER ( 9 or 10 ) |
| 13 | 025 | PALLETIZER FULL (LATCH ON AT TOP, OFF AT BOT.) |
| 4 | 026 | MODE = 2, RESET TO 0 |
| 5 | 027 | LAYER BOX COUNT = 4-9 |
| 5 | 028 | LAYER BOX COUNT = 0-4 |
| 5 | 029 | LAYER BOX COUNT = 0-3 |
| 8 | 030 | PADDLE READY O.S. |
| 8 | 031 | PADDLE READY O.S. LATCH |
| 8 | 032 | PADDLE READY W/TRAY O.S. |
| 8 | 033 | PADDLE READY W/ TRAY O.S. LATCH |
| 9 | 034 | BOX DELIVERED O.S. |
| 9 | 035 | BOX DELIVERED O.S. LATCH |
| 9 | 036 | ARM OUT OF ELEVATOR O.S |
| 9 | 037 | ARM OUT OF ELEVATOR O.S. LATCH |
| 14 | 038 | STEP BAR STEPPER FOR STEP 3 & 4 |
| 8 | 039 | LOCKOUT PALLET UP IN BAR STEP 3 & 4 |
| 7 | 040 | WAIT FOR NEXT BOX IN ELEVATOR |

FIG. 77

APPARATUS FOR LOADING AND PALLETIZING BOXES AND CARTONS, ESPECIALLY FROM AN AGRICULTURAL FIELD

BACKGROUND OF THE INVENTION

The present invention relates to an apparatus and method for loading and palletizing boxes and cartons, especially boxes and cartons containing agricultural products which are sitting in an agricultural field.

Many agricultural crops are harvested and packaged in boxes or cartons for immediate transportation to a market for sale to the consuming public. The most widely known example of such an agricultural product is lettuce, but many other products undergo a similar process. As a result, it is necessary to load the boxes and cartons containing the agricultural products onto a truck for transportation to a cooling facility or a loading facility, wherein the products are placed on rail cars or semitrucks for transportation to the local market.

To date, no satisfactory apparatus or method has been devised wherein such boxes or containers may be loaded and stacked on a truck absent the use of significant manual labor. Farms producing such agricultural products typically have a crew of five workers who are responsible for loading the boxes and cartons containing the agricultural products onto each truck used to transport the products out of the fields. Typically, for each truck being loaded, the two persons known as loaders walk along the ground until they come to filled boxes or cartons containing the agricultural products. The loaders each manually lift and throw one of the boxes to one of the two persons who are standing on the truck bed and who are known as stackers. The stackers each catch and stack the containers or boxes of agricultural products onto pallets on the truck bed. A fifth person is required to slowly and carefully drive the truck through the fields while the loaders and stackers fill the truck.

As is easy to imagine, there are a number of inherent problems in this arrangement. First, significant injuries to the loaders or the stackers may result from their activities in the field. Moreover, loading is slow, inefficient and subject to the various problems associated with worker dissatisfaction. Other problems with such an arrangement include the high cost of manual labor for retrieving filled boxes or containers of agricultural products from the field.

Conventional loading and palletizing machines are unacceptable due to the uneven surface and rough terrain of an agricultural field. One attempt to provide a device for use in a field under similar circumstances is set forth in Adam, U.S. Pat. No. 4,355,713, patented Oct. 26, 1982. As is seen from a reading of that reference, the Adam device relates to a mechanism by which cartons of agricultural products may be lifted from their resting place in the filed and placed on a conveyor belt. The Adam device, however, has encountered reliability and maintenance problems due to the working environment of the agricultural field. In addition, the Adam device does not negate the need to manually lift and stack the boxes or cartons onto the truck bed and the concomitant problems associated therewith.

SUMMARY OF THE INVENTION

The present invention includes a method and means for loading and stacking boxes and containers, especially boxes and containers resting on the ground in an agricultural field. The apparatus and method may be used in agricultural fields to pick up, load, stack and palletize boxes or cartons for subsequent cooling and/or transportation, without the use of extensive manual labor as required by previous devices and methods.

The loader portion of the present device includes at least two belts of endless construction having a friction material bonded thereto for gripping the box or carbon as it enters the forward end of the loading device. Means to retain the belt system against the carton, thereby providing the desired clamp engagement force while also allowing for slight variations in the size of the carton or box, is also provided. The loader is suspended through a self-aligning alignment system which permits the loader to move laterally in order to allow the present device and method to compensate for variations in alignment of boxes or cartons along the row of the agricultural field. Flanged alignment pawls extends from the front of the loader device to guide the front end of the loading device into engagement with the carton or container.

Conveyor means are used to transport the cartons or boxes from the discharge end of the loader to a stacker and palletizer means including an elevator means. A microprocessor receiving various inputs is used to control the stacking, palletizing and other various functions and movements of the present apparatus and method based on the size of the truck and the carton, as well as the number of rows and sections of boxes or cartons previously assembled on the truck.

The palletizer includes a movable false floor mounted on a track and rollers which is used as a prestacking area. A transfer mechanism transports the filled boxes or containers from the elevator means to the palletizer prestacking area. Where it is desired to employ alternative stacking, the present device includes a means for rotating the box or carton by 90° prior to releasing the box or carton into the prestacking area.

After assembling the appropriate number of boxes or cartons in the prestacking area for the desired row, a discharge mechanism is used to position the arranged boxes or cartons up to the adjacent tailgate or previously stacked cartons. When a complete section of boxes or cartons has been assembled in the prestacking area, the prestacking area false floor is withdrawn, allowing the assembled boxes or cartons to come to rest on the pallets, the bed of the truck or the previously stacked boxes or cartons on the bed.

The height and position of the palletizer is controlled by movement of a carriage mechanism mounted on the bed of the present invention. The carriage includes means for moving the palletizer along the longitudinal and vertical directions within the bed, as directed by a microprocessor.

The present invention also includes means to interlock the tuck with a transport truck and means to slide the pallets off the bed of the present invention onto the transport truck. The present invention is also constructed so as to allow the boxes or cartons to be removed from one side of the truck with a forklift or the like if desired.

Therefore, it is an object of the present invention to provide a method and unitary means which may be attached to a truck, for loading and stacking boxes and cartons, especially from an agricultural field, which will significantly reduce the amount of manual labor involved in such activities.

It is a further object of the present invention to provide a method and means for loading boxes or cartons sitting on an uneven surface onto a conveyor for transportation to the present stacking and palletizing device.

It is a further object of the present invention to provide a method and means for efficiently and effectively stacking an palletizing boxes or cartons in a large number of desirable patterns.

It is a further object of the present invention to provide a method and means for unloading, stacking and palletizing boxes or cartons onto a bed having rollers thereon by a unitary mechanism mounted on the truck.

It is a further object of the invention to provide a method and means of loading, stacking and palletizing boxes or cartons onto pallets on a truck so as to permit off loading of such pallets either by sliding them off the rear of the truck or by lifting them off the side of the truck with a forklift or the like.

It is a further object of the present invention to provide a method and means for controlling the functions and movements of the present device through a microprocessor. Other and more detailed objects of the present invention shall become apparent upon examination of the materials contained herein.

DESCRIPTION OF THE FIGURES

The invention will be more readily understood from the following description of preferred embodiments given, by way of example, with reference to the accompanying drawings, in which:

FIG. 10 is a front elevation of the loading apparatus and its support structure;

FIG. 11 is a rear elevation of the lifting apparatus suspension mechanism;

FIG. 12 is a cross sectional view taken substantially along line 12—12 of FIG. 11;

FIG. 13 is a schematic control diagram of the loader mechanism;

FIG. 30 is a schematic view of the palletizer frame with the carriage frame shown in phantom;

FIG. 31 is a plan view of the palletizer frame as mounted on the upper carriage support frame;

FIG. 32 is a back view of the palletizer as mounted on the upper carriage assembly;

FIG. 33 is a plan view of the assembled major components containing the present device;

FIG. 34 is a left side view of the palletizer frame and false floor;

FIG. 35 is a top view of the left side palletizer guide roller;

FIG. 36 is a top view of the right side palletizer guide roller;

FIG. 37 is a top view of a portion of the palletizer false floor;

FIG. 38 is a cross sectional view taken substantially along line 38—38 of FIG. 7;

FIG. 41 is a cross sectional view of the tamping bar extension mechanism showing the tamping bar in its extended position in phantom;

FIG. 51 is a plan view of the rocker mechanism;

FIG. 52 is a plan view of the rotation cam mechanism;

FIG. 53 is a left side view of the transfer mechanism drive with sensors;

FIG. 56 is a a perspective view of the tamping bar cam mechanism;

FIGS. 58-80 are program listings for use with the microprocessor to control the present invention.

DESCRIPTION OF THE PREFERRED EMBODIMENTS

Figures 1, 2:
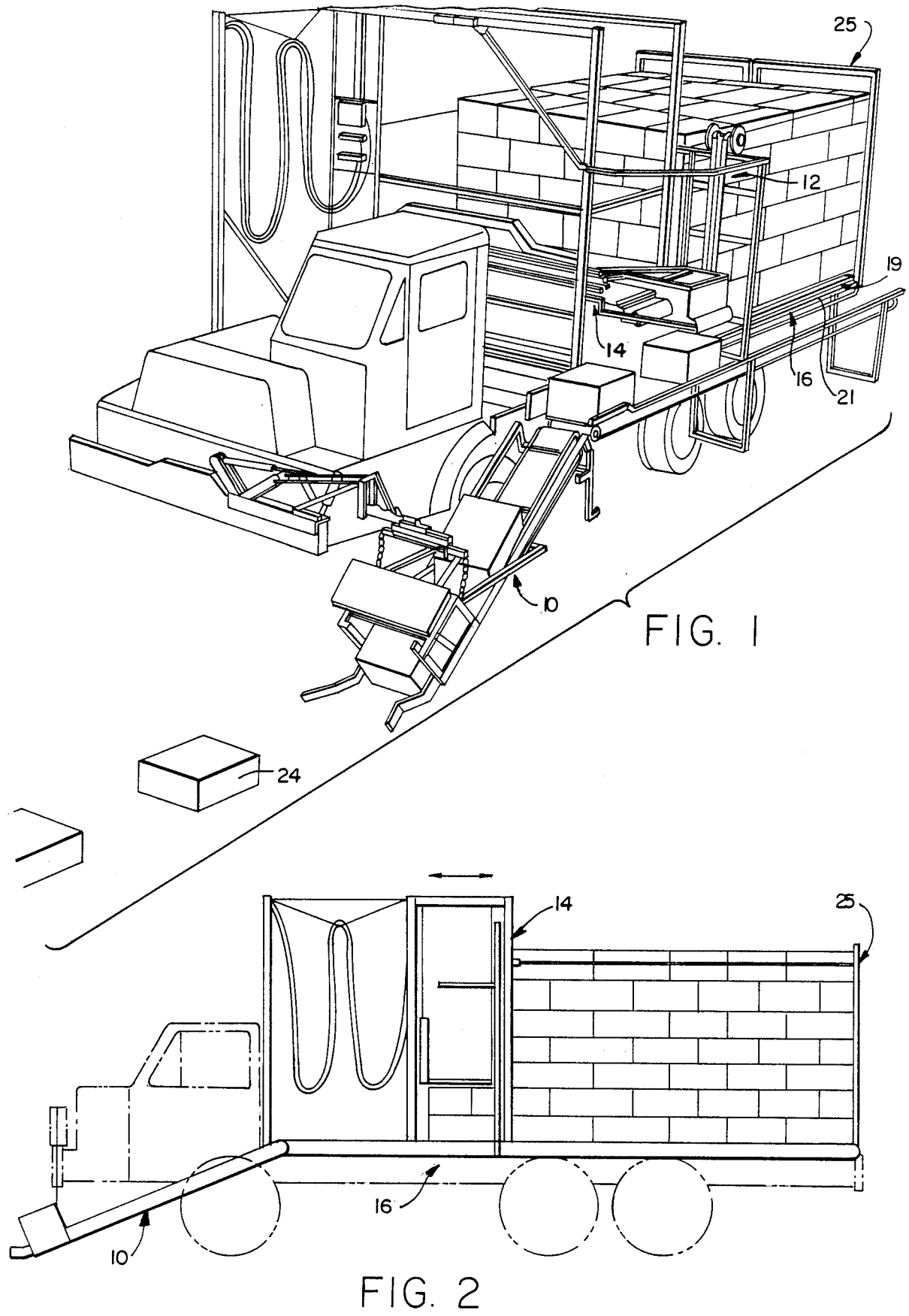
FIG. 1 is a perspective view of the present invention.
FIG. 2 is a left side view of the overall device containing the present invention.
Figure 3:
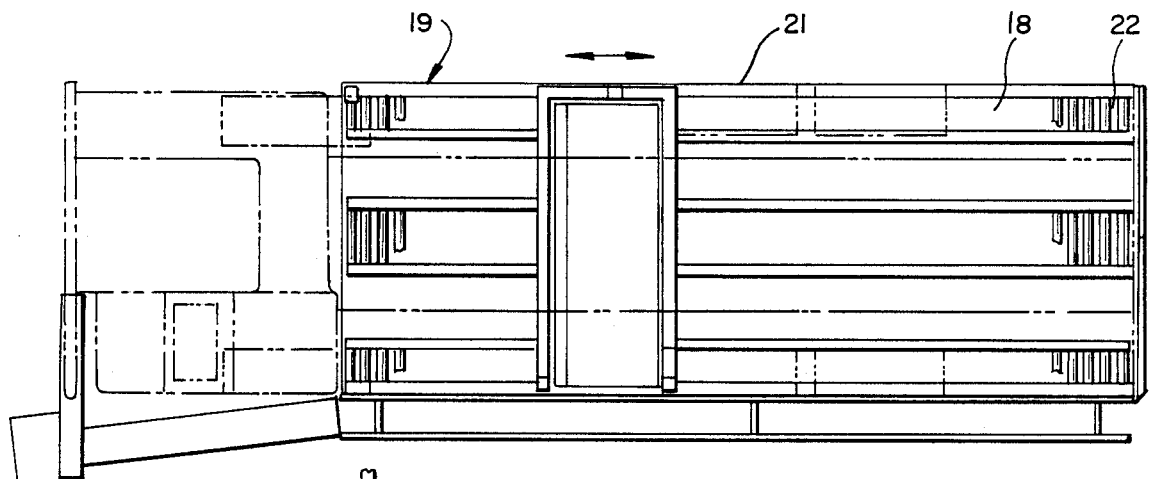
FIG. 3 is a top view of the overall device containing the present invention.
Figure 54:
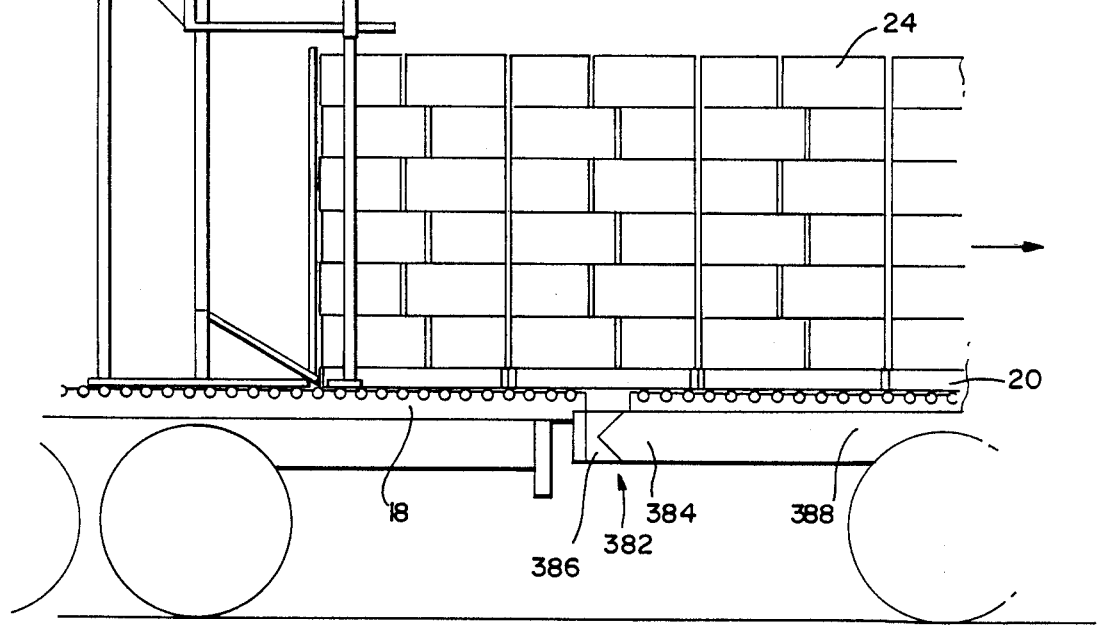
FIG. 54 is a left side view illustrating the carbon offloading alignment apparatus.

As used herein, the term "longitudinal" shall apply to the longitudinal direction of the loader truck bed 18 and the loader bed 19 aligned therealong and attached thereto, as depicted by the double-headed arrows in FIGS. 2 and 3. Similarly, "transverse" shall refer to the horizontal direction across the truck bed 18 and the loader bed 19 which is perpendicular to the longitudinal direction. Finally, the directions "left" and "right" as used herein shall refer to the left and right transverse sides of the mentioned article when facing the same direction as the truck.

As is apparent from an examination of the figures, the present method and apparatus includes three basic components: the lifting and the loader method and apparatus, the elevator and palletizing method and apparatus, and the apparatus and means for controlling the various functions of the present device.

Looking to FIGS. 1-4, the apparatus of the present device is typically mounted on a truck 16. Although it is expected that the truck 16 will be a standard truck known in the industry as a "Fabco" truck, having six independently driven wheels and approximately equal weight distribution to each wheel, for use in driving through the agricultural fields or the like, the present invention is not limited to use with such a truck.

The width of the truck bed 18 is typically approximately the same as two standard pallets 20, as seen in FIG. 1. The loader bed 19 is approximately the same size and is aligned along its width and length with the truck bed 18. The bed 19 of the present invention includes a frame 21 having a series of rows of rollers 22 rotatably fixed therein. The rollers 22 facilitate the ease of loading and unloading of pallets containing boxes or cartons 24 which have been loaded, arranged and stacked by the present device. A tailgate 25 also extends from the frame 21 of the present device. The tailgate 25 serves to provide a rear longitudinal stop for the arranging, stacking and palletizing of boxes or cartons upon the bed 19.

Referring now to FIGS. 1, 4-9 and 14, it can be seen that the loading apparatus 10 includes a first conveyor means 26, a support frame, a lifting apparatus 29 and a harness hanger 30. In the preferred embodiment, the lifting apparatus 29 lifts the boxes or cartons 24 from the ground or other surface on which they rest by two parallel endless belts 32 having friction material formed thereon. The belts are positioned in the lifting apparatus 29 at an angle A from the horizontal surface which is greater than the angle B from the horizontal surface of the first conveyor means 26.

As such, boxes or cartons 26 lifted by the parallel endless belts 32 of the lifting apparatus 29 of the loader means 10 will be lifted over the leading or front edge (i.e. the edge to the left in FIG. 4) of the first conveyor means 26 and deposited onto the conveyor means for subsequent transportation to the elevator apparatus 12 and palletizer apparatus 14. In addition, by having the angle A of the endless belts being greater than the Angle B of the first conveyor means 26, boxes which slip somewhat during the lifting process are still raised high enough by the endless belts 32 to clear the front or leading edge of the first conveyor means 26, thereby avoiding jamming of the loader mechanism 10.

Moreover, since the belts 32 of the lifting apparatus 29 are positioned at an angle A from the horizontal, the lifting apparatus 29 may be suspended above ground level to avoid collisions between the lifting apparatus 29 and the ground. In addition, this also allows the endless belts 32 to grip the boxes or containers near the top of the box or container, thereby avoiding damage to the agricultural products contained therein.

Flanged alignment pawls 34 are attached to the front of the loader 10 near ground level in order to align the loader 10 with each individual box or carton 24. An upper guide member 36 is positioned along the upper portion of the lifting apparatus 29 to prevent boxes or cartons 24 from climbing out of the lifting mechanism endless belts 32. The upper guide member 36 is arranged such that its angle of inclination C from the horizontal is approximately equal to the angle of inclination B of the first conveyor means 26.

The lifting apparatus 29 also includes a rigid structural frame 38. On the right side of the rigid structural frame 38 (i.e. to the left in FIGS. 6, 8 and 9) the endless belt 32 is powered through a right driven pulley 40, a shaft 64 and a second right driven pulley 41. The endless belt 32 is positioned about the second right driven pulley 41, a right idler pulley 42 and a right tension pulley 44. Second right driven pulley 41, right idler pulley 42 and right tension pulley 44 are each mounted to the lifting apparatus rigid structural frame 38 on the right side of the loading apparatus 29.

On the left side of the lifting apparatus (i.e. to the right in FIGS. 6, 8 and 9), the endless belt 32 is similarly driven by a left driven pulley or sprocket 46, a shaft 64 and second left driven pulley 47. The second left driven pulley 47, left idler pulley 48 and left tension pulley 50 are each mounted to a pivoting frame 52. The pivoting frame 52 is pivotally connected to the rigid structural frame 38 through two pivot joints 54 on the left side of the loading apparatus 29. A spring tension member 56 is used to bias the pivoting frame 52 against a plate 58 fixedly connected to the left side of the rigid structural frame 38.

Figure 8:
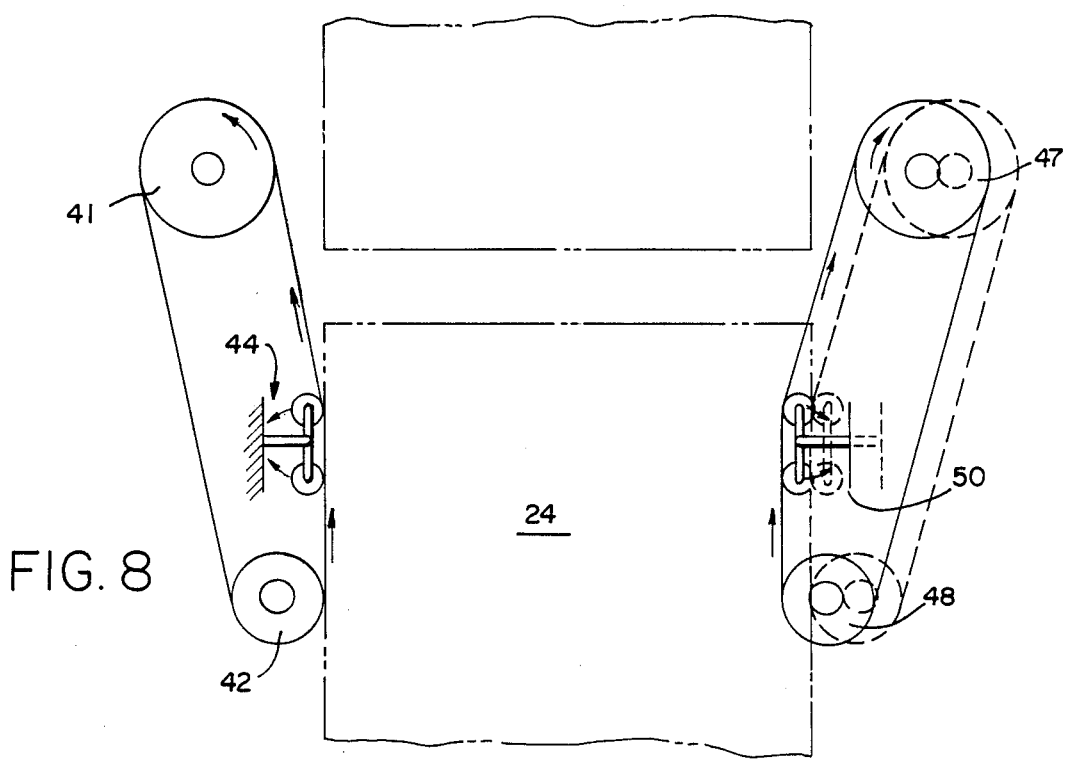
FIG. 8 is a schematic plan view of the loader mechanism.
Figure 9:
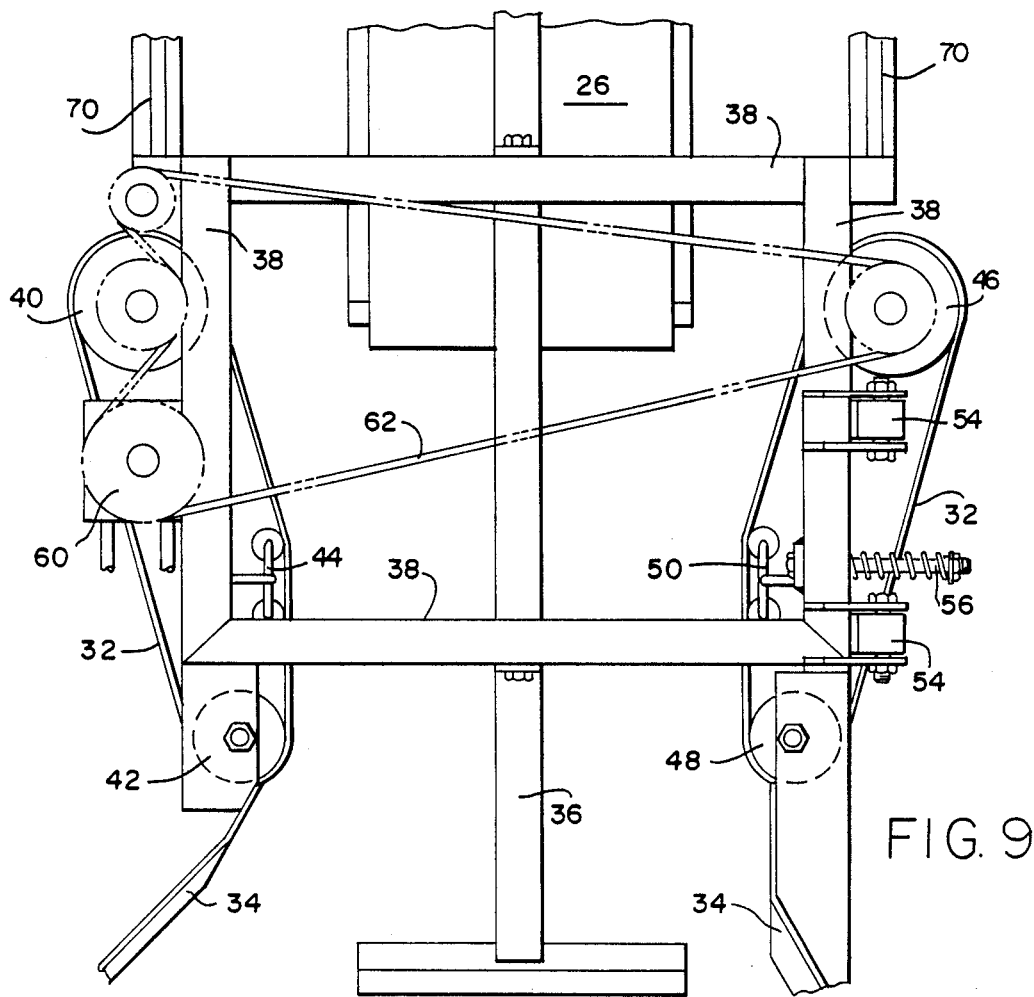
FIG. 9 is a plan view of the lifting apparatus.

As is illustrated in FIG. 8, the pivoting frame 52 pivots about the axis formed by the pivot joints 54, thereby enabling the lifting apparatus 29 to accommodate slight variations in the size of the box or carton 24 being picked up. Such size variations are common for boxes or cartons of agricultural products since such products are not of uniform size.

A hydraulic motor 60 drives the left and right side driven pullies or sprockets 40 and 46, respectively, through an endless drive belt or chain 62 connected therebetween. Bearings 66 act to support each of the drive shafts 64 along their length. As is most clearly illustrated in FIG. 5, the drive shaft 64 and support bearing 66 on the left side of the lifting apparatus are mounted to the pivoting frame 52 to further facilitate the pivoting motion hereinabove described.

Figure 5:
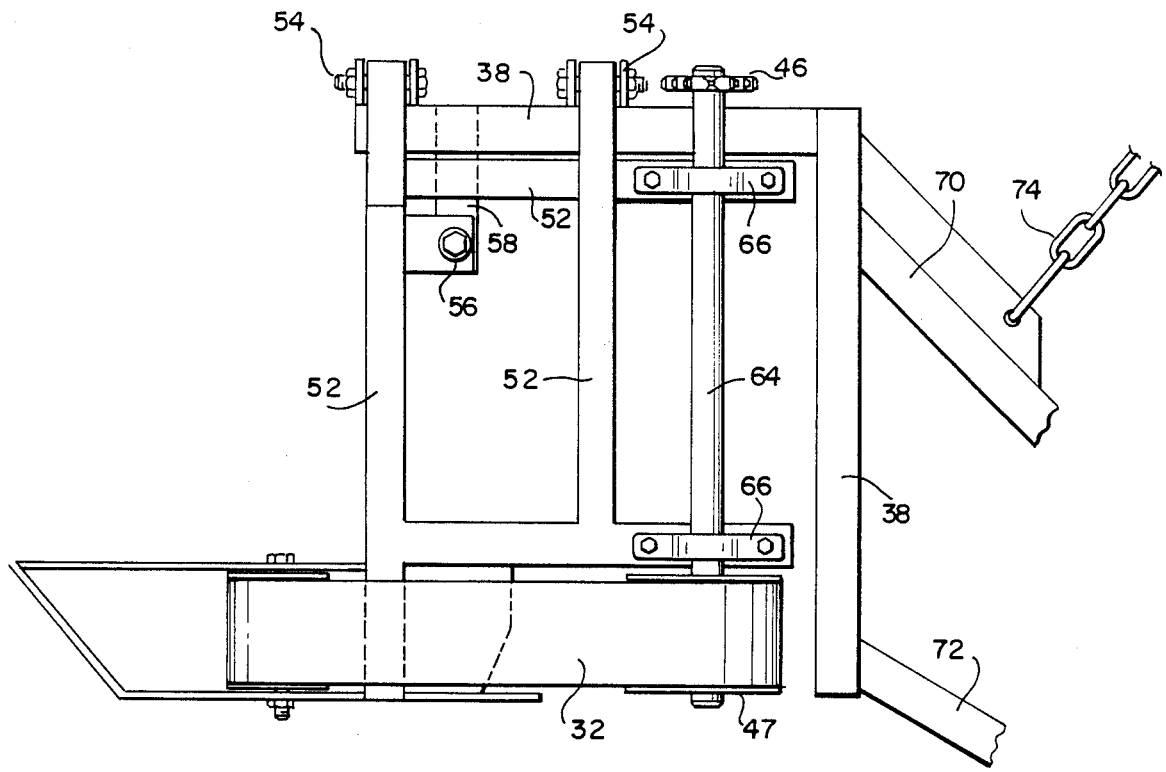
FIG. 5 is a left side view of the loading apparatus.
Figure 4:
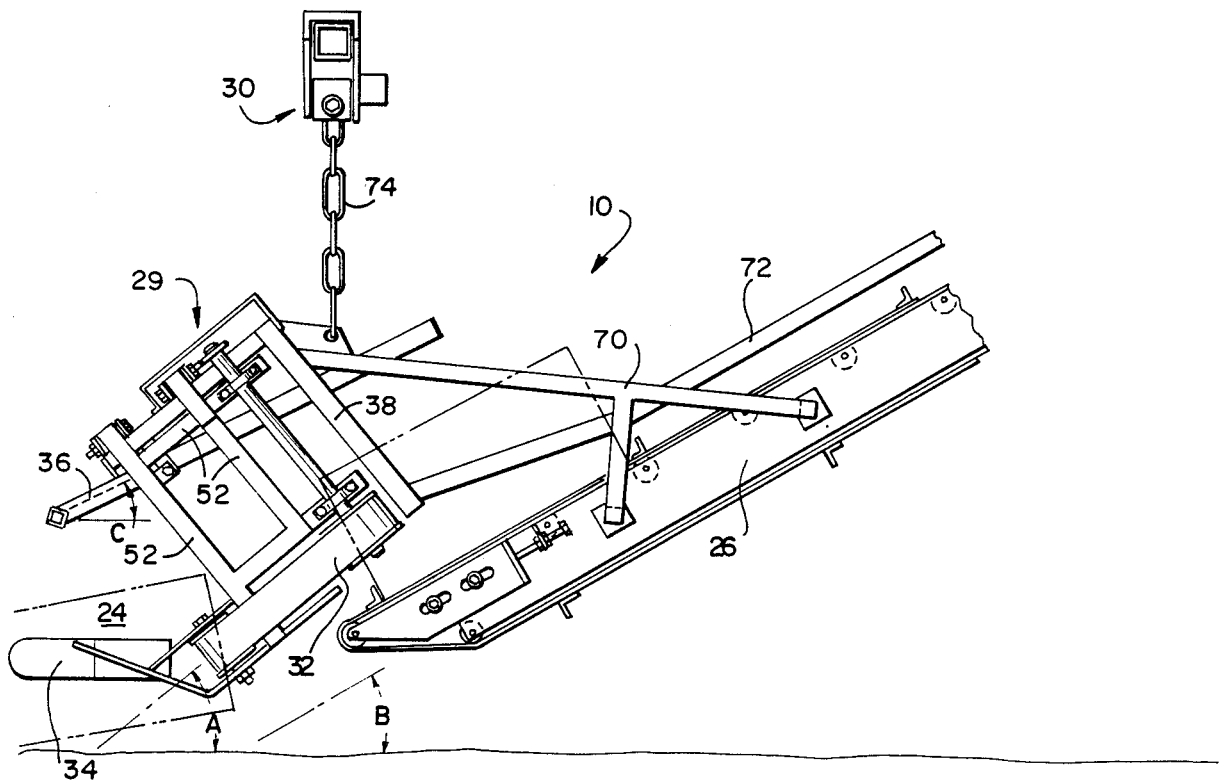
FIG. 4 is a left side assembly elevation of the loader mechanism.
Figure 6:
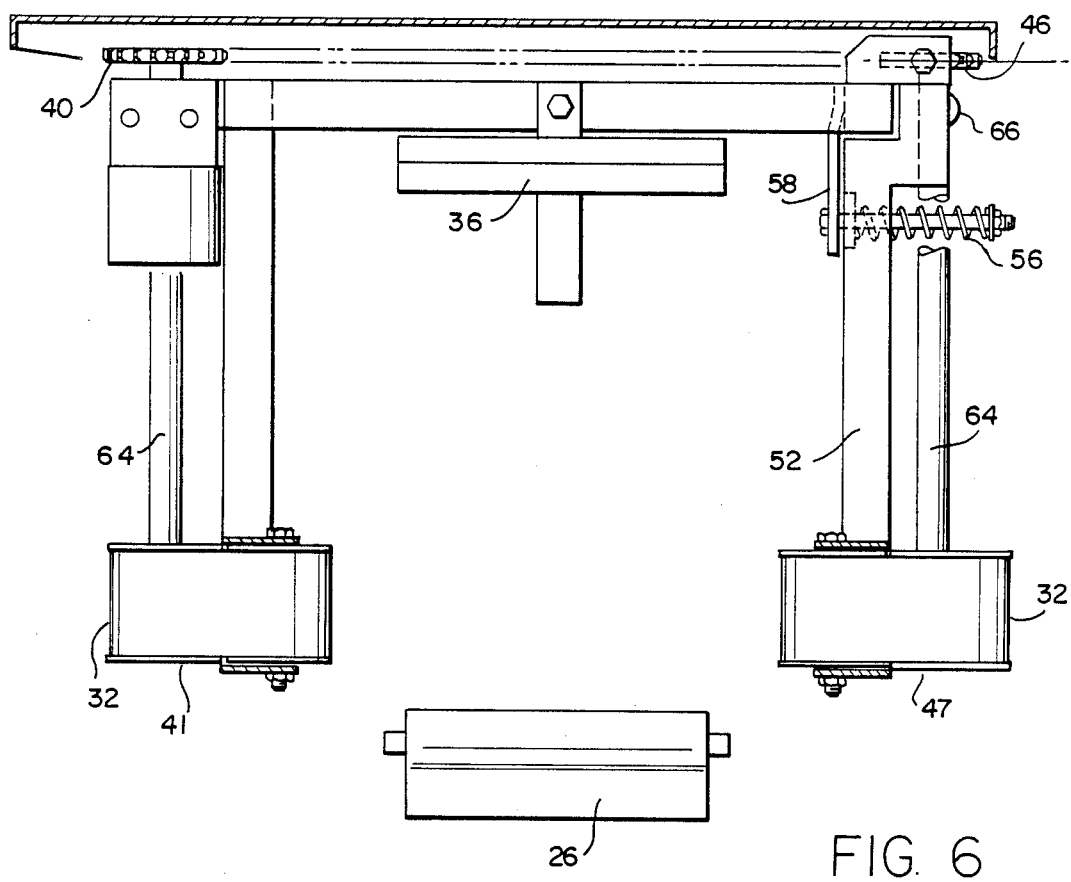
FIG. 6 is a front view of the loading apparatus.
Figure 7:
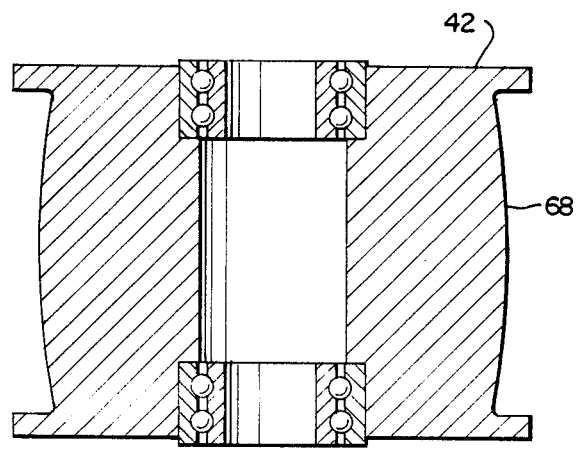
FIG. 7 is a cross-sectional view of a sculptured pulley.

In order to reduce drive chain or belt 62 derailment resulting from the pivoting motion of the left side endless belt drive shaft 64, the left side driven pulley or sprocket 46 should be aligned along the axis of rotation of the pivoting frame 52 created by the pivot joints 54, as is most clearly shown in FIG. 5. Further, sculptured pullies, such as that shown in FIG. 7, having a slightly convex drive surface 68 enable the belt to maintain maximum surface area contact with the pulley even when the pivoting frame 52 is at its maximum extended pivoted position. Although FIG. 7 is of an idler pulley 42, it should be understood by those skilled in the art that a similarly shaped pulley could be used throughout the present invention.

The lifting apparatus rigid structural frame 38 is connected to the first conveyor means 26 through a connecting frame 70. Further, a guide rail 72 extends from the rigid structural frame 38 and along the length of the first conveyor means 26 to provide additional protection against carton or box 24 dislodgement while the boxes or containers 24 are travelling along the first conveyor means 26.

The lifting apparatus 29 is suspended from a pair of tension members 74 connected between the harness hanger 30 and the connecting frame 70. As shown in FIGS. 10–12, the harness hanger 30 is attached to the support frame 28 which in turn is affixed to the truck 16. The tension members 74 are connected to a lateral positioning member 76 which is mounted on rollers 80 within the main harness member 78 in order to permit the lateral movement of the lateral positioning member 76 relative to the main harness member 78.

A realignment apparatus 81 acts to bias the lateral positioning member 76 towards the preselected center position of the main harness member 78. The realignment apparatus 81 includes a tongue member 82 which is fixedly secured to the lateral positioning member 76. A pin member 84 is positioned through an aperture in the tongue member 82 and fixedly secured to the main harness member 78 at both ends of the pin member 84 through connecting tabs 85. Spring members 86 positioned about the pin member 84 and extending between each side of the tongue member 82 and the connecting tabs 85 act to bias the lateral positioning member 76 towards the preselected center position. The centeral position may be varied depending on the size and elastic coefficient of the spring members 86.

As described hereinabove, the harness hanger 30 allows the lifting apparatus 29 to move laterally (i.e. to the left and right in FIG. 10) in order to compensate for variations in the position of the boxes or cartons 24 in the agricultural field. This lateral movement may result from a swinging of the lifting apparatus 29 relative to the harness hanger 30 through the tension members 74 or by movement of the lateral positioning member 76 within the harness hanger mechanism 30. Upon lateral movement by the lateral positioning member 76, the realignment apparatus 81 acts to reinstate the preselected alignment of the lifting apparatus 29 through the harness hanger mechanism 30.

The lifting apparatus 29 and harness hanger 30 are initially positioned through the loading apparatus support frame 28. As is shown in FIGS. 10 and 11, the harness hanger 30 is suspended from the lateral support extension member 88. The movement of the harness hanger apparatus 30 along the lateral support extension member 88 is accompanied by an electric drive screw actuator 90 which is powered by an electric motor 92. The screw actuator 90 acts to slide the harness hanger mechanism 30 laterally along the lateral support extension member 88.

The loading mechanisms support frame also includes a first pivoting member 94. One end of the first pivoting member is connected to a second electric drive screw actuator 96 through a strut 98. The screw actuator 96 is mounted on a first fixed link 99. A tie bar 100 provides additional support between the strut 98 and the first pivoting member 94. The second end of the first pivoting member 94 is connected to the vertical extension 106 of the lateral extension member 88. A fixed link 102 and a pivoting tie rod 104 are connected to the vertical extension member 106 of the lateral support extension member 88.

As will be understood by those skilled in the art of linkages, when properly arranged, extension or contraction of the second screw actuator 96 through a second electric motor 97 will result in vertical movement of the harness hanger 30 and the lifting apparatus 29. In order to provide smooth vertical movement of the lifting apparatus support frame 28, a damping member 108 is connected between the strut member 98 and fixed link 102. As illustrated in FIG. 13, vertical and lateral movement of lifting apparatus 29 may be controlled by the operator in the truck cabin through a joy stick 110.

After boxes or cartons 24 have been lifted onto the first conveyor means 26 through lifting apparatus 29, first conveyor means 26 transports the boxes or containers 24 to a second conveyor means 112. In the preferred embodiment, second conveyor means 112 is a chain conveyor 114 driven by a hydraulic motor 116 connected to the chain conveyor 114 through a drive shaft 118 and a drive belt or chain and sprocket device 120. Guard members 122 are positioned near the transition from the first conveyor means 26 to the second conveyor means 112 and extend along the longitudinal length of the second conveyor means 112 to inhibit the dislodgement of boxes or cartons 24 thereon.

Figure 15:
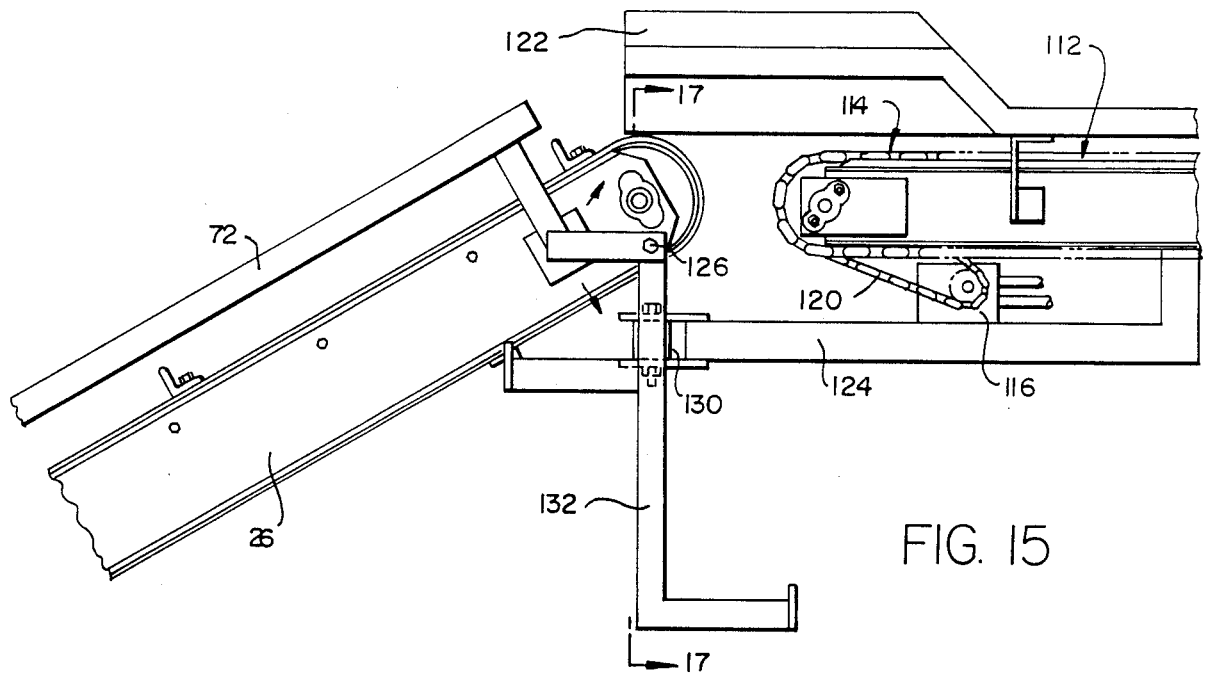
FIG. 15 is a left side assembly elevation of the first and second conveyor means.
Figure 16:
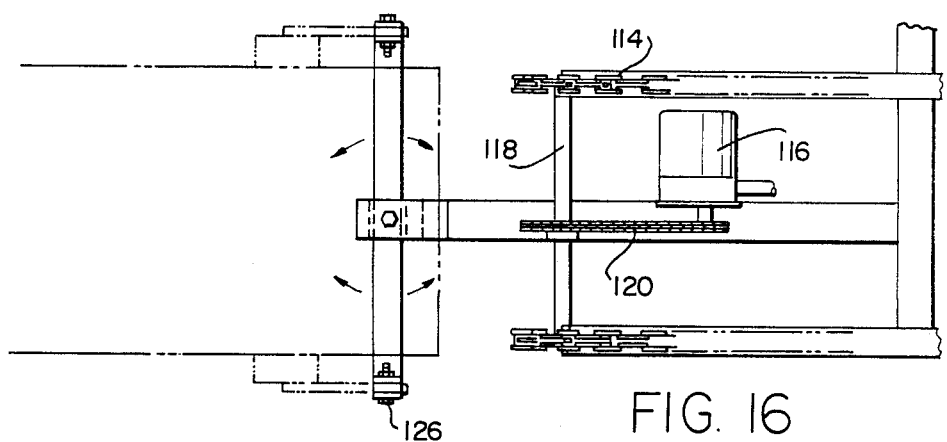
FIG. 16 is a plan view of the first conveyor means swivel mechanism.
Figure 17:
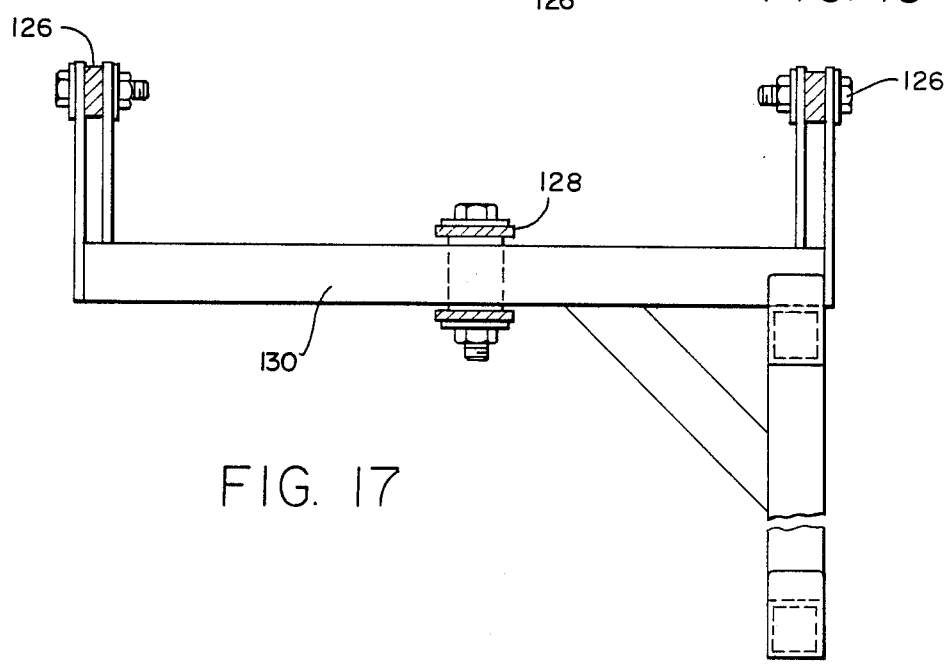
FIG. 17 is a cross sectional view taken substantially along line 17—17 of FIG. 15.

In order to accommodate the freedom of movement of the lifting apparatus 29, the first conveyor means 26 is connected to support member 124 to allow both vertical and horizontal pivoting. As shown in FIGS. 15 through 17, vertical pivoting of first conveyor means 26 is accomplished through a pair of vertical pivot joints 126, while horizontal pivoting is accomplished through a horizontal pivot joint 128 connected to the first conveyor means horizontal connecting member 130.

Access to the truck bed 18, the transloader bed 19 and truck cab is provided through ladder means 132 connected to the first conveyor means 26 and to the support member 124.

Figure 18:
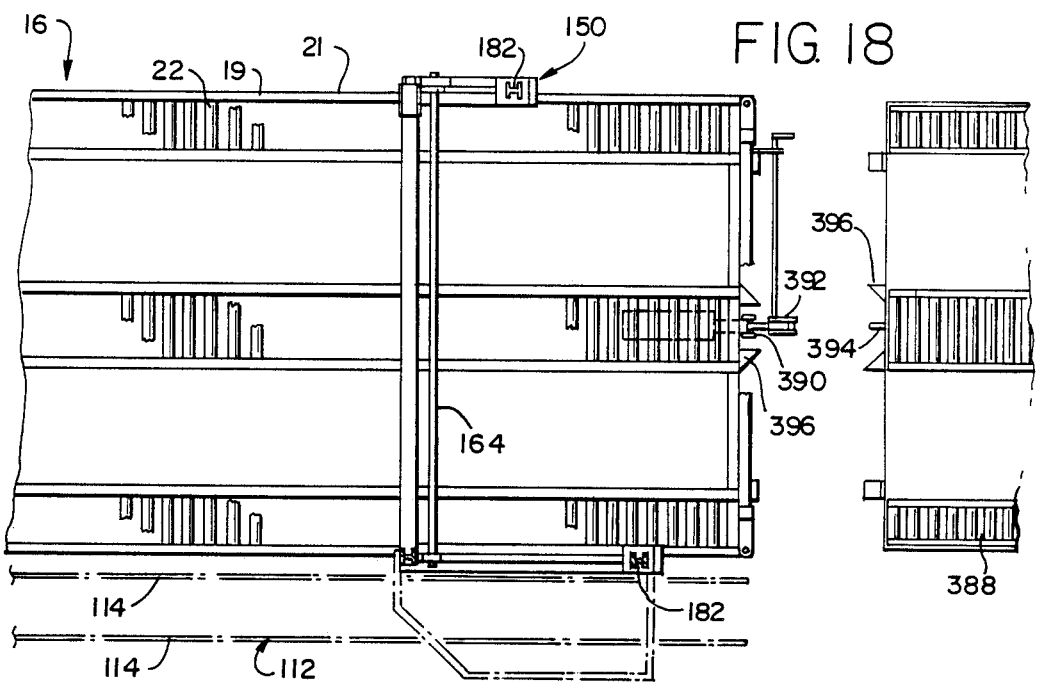
FIG. 18 is a plan view of the carriage frame mounted on a truck bed and including a truck alignment apparatus.
Figure 19:
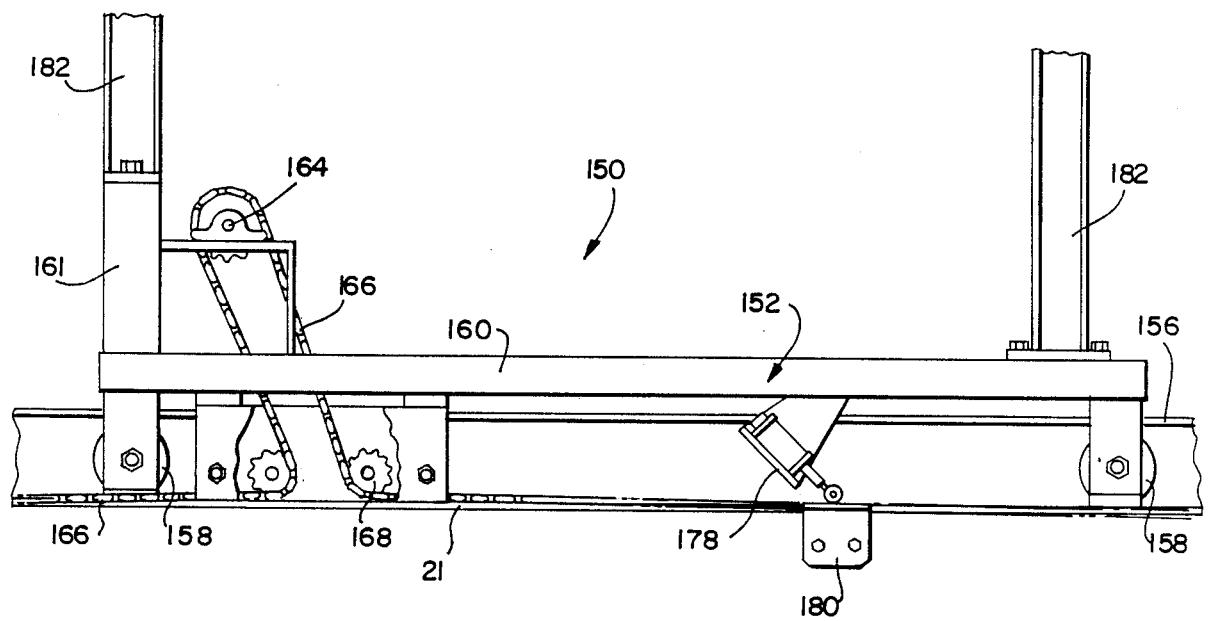
FIG. 19 is a left side elevation of the lower portion of the carriage mechanism.
Figure 20:
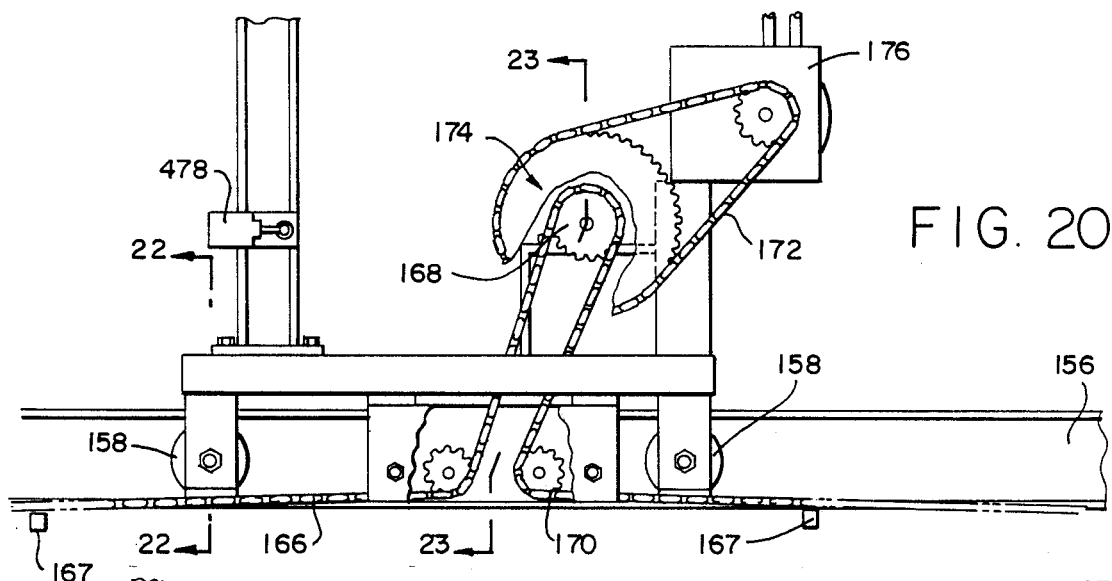
FIG. 20 is a right side elevation of the lower portion of the carriage mechanism.
Figure 21:
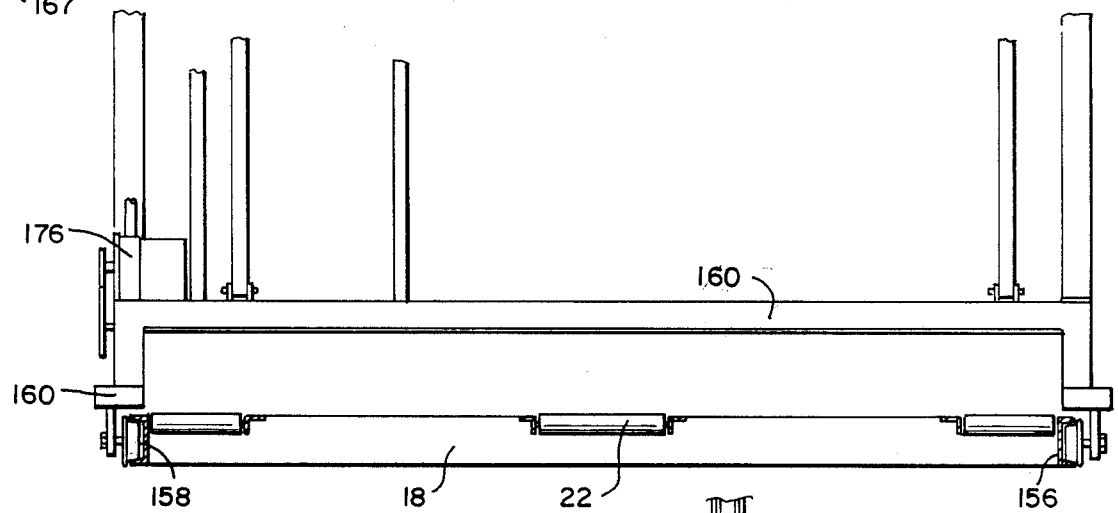
FIG. 21 is a front view of the lower portion of the carriage mechanism as mounted on a truck.
Figure 22:
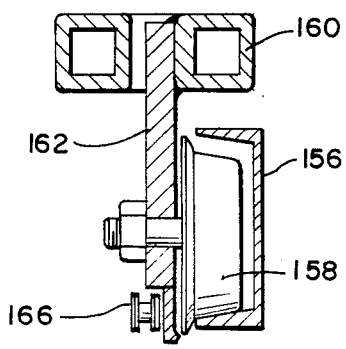
FIG. 22 is a cross sectional view taken substantially along line 22—22 of FIG. 20.
Figure 23:
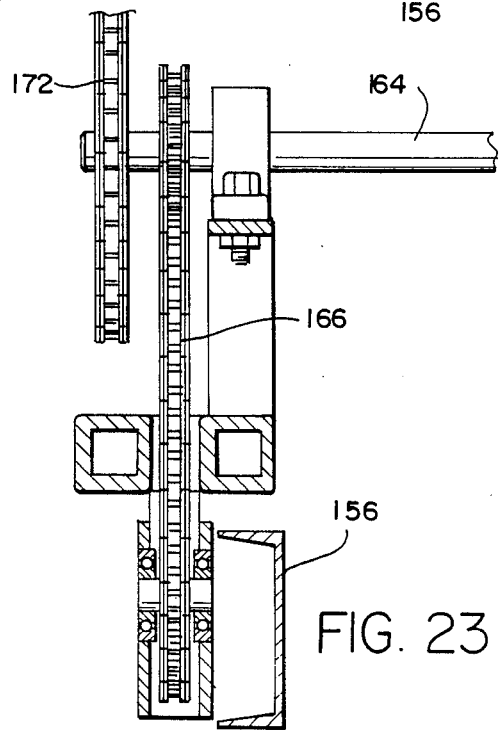
FIG. 23 is a cross sectional view taken substantially along line 23—23 of FIG. 20.

As shown in FIGS. 19–24 and 30, a movable carriage 150 is mounted so as to be able to move longitudinally along the bed 19 of the present invention (i.e. to the front and back of the truck, which is to the left and right in FIGS. 18–20, respectively). The carriage 150 has a lower portion 152 and an upper portion 154. The lower portion of the carriage 152 is mounted onto the frame 21 of the transloader bed 19 through a channel 156 and trolley wheel 158 arrangement. The carriage trolley wheels 158 ride within the channel 156 formed in the frame 21 of the transloader bed 19 and are connected to the lower carriage support frame through a connecting plate 162. The lower carriage support frame includes two longitudinal members 160 and at least one transverse member 161.

A main carriage drive shaft 164 is carried by the carriage 150 and mounted transversely to the truck bed 18. A fixed length chain 166 is secured along each longitudinal edge of the bed 19. Tabs 167 act to support the chain 166 along its length. The chain 166 meshes with sprockets 168 positioned on each end of the main drive shaft 164 and with idler sprockets 170 carried by the lower carriage support frame 160.

Longitudinal positioning of the carriage is accomplished by driving the main drive shaft 164 through a chain 172 and sprocket 174 mechanism attached to a hydraulic motor 176 on the right side of the carriage 150. As will be appreciated by those skilled in the art, rotation of the drive mechanism 172 and the carriage drive shaft 164 will result in longitudinal movement of the carriage along the length of the bed 19 through the channel 156 and trolley wheel 158 arrangements.

A first rolling trip sensor 178 is connected to the left side of the carriage lower portion 152 to provide a signal to the control unit as to the position of the carriage 150 based on prepositioned trip plates 180 as will hereinafter be more fully described.

The vertical support members 182 of the carriage upper portion 154 are connected to the lower carriage support frame longitudinal members 160 and transverse member 161. In the preferred embodiment, there are two upper carriage vertical support members 182 on the left side of the upper carriage 154 and one vertical support member 182 on the right side of the upper carriage 154. Only one vertical support member 182 is provided on the right side of the upper carriage 154 so as to permit the off loading of stacked, arranged and palletized boxes or cartons from the right side of the truck through a forklift or the like. This additional flexibility allows users of the present invention to have the option of either off loading the truck through the off loading device as hereinafter described or off loading through a forklift or the like.

The vertical support members 182 are connected to an upper carriage upper support frame having two transverse members 184 and one longitudinal member 186. An elevator support arm 188 extends from one of the transverse members 184 of the upper carriage portion 154 upper support frame to act as a pin support joint for the pivotally mounted elevator mechanism 12.

Figure 26:
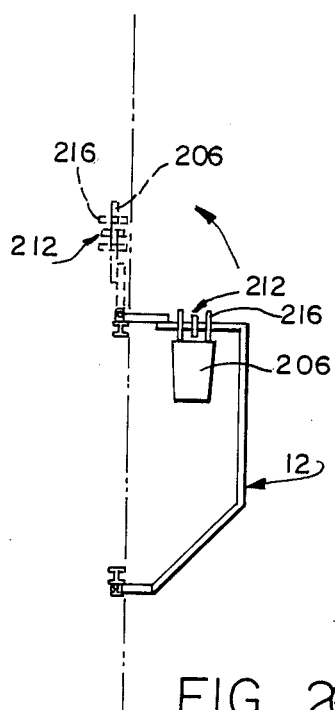
FIG. 26 is a top view illustrating the elevator in its operative and stored positions for over-road hauling.
Figure 25:
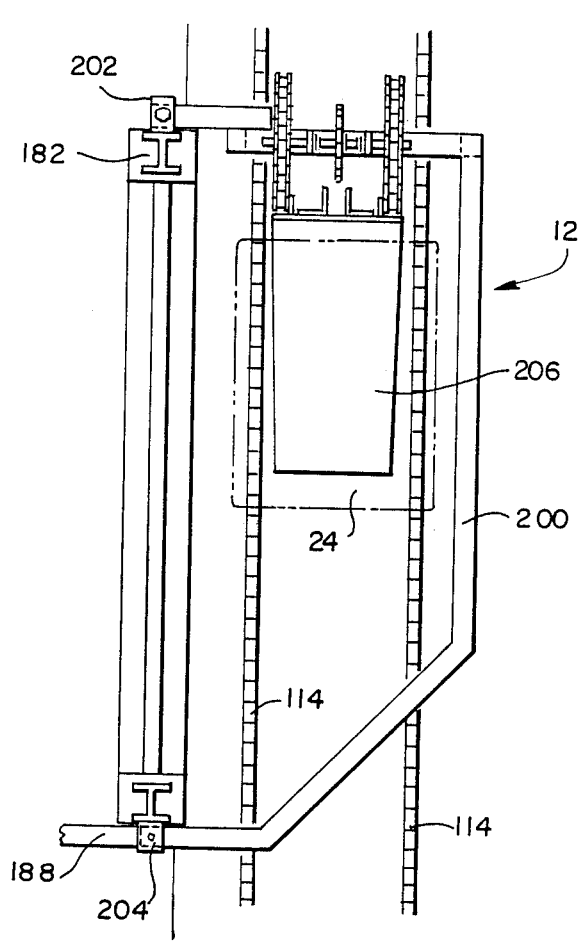
FIG. 25 is a plan view of the elevator mechanism.
Figure 29:
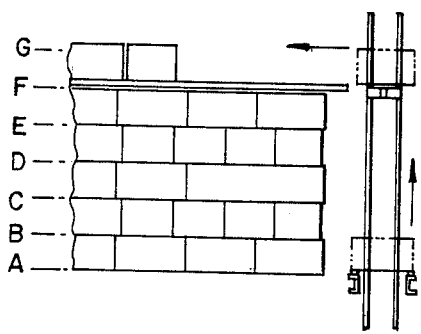
FIG. 29 is a schematic view of use of the elevator apparatus.
Figure 28:
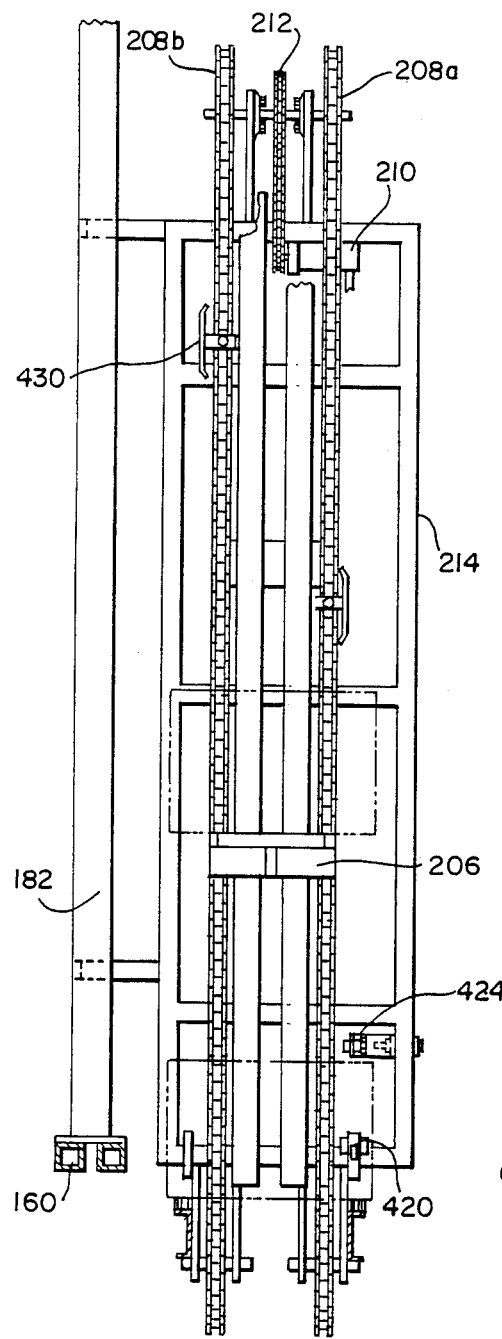
FIG. 28 is a front elevation of the elevator apparatus.
Figure 27:
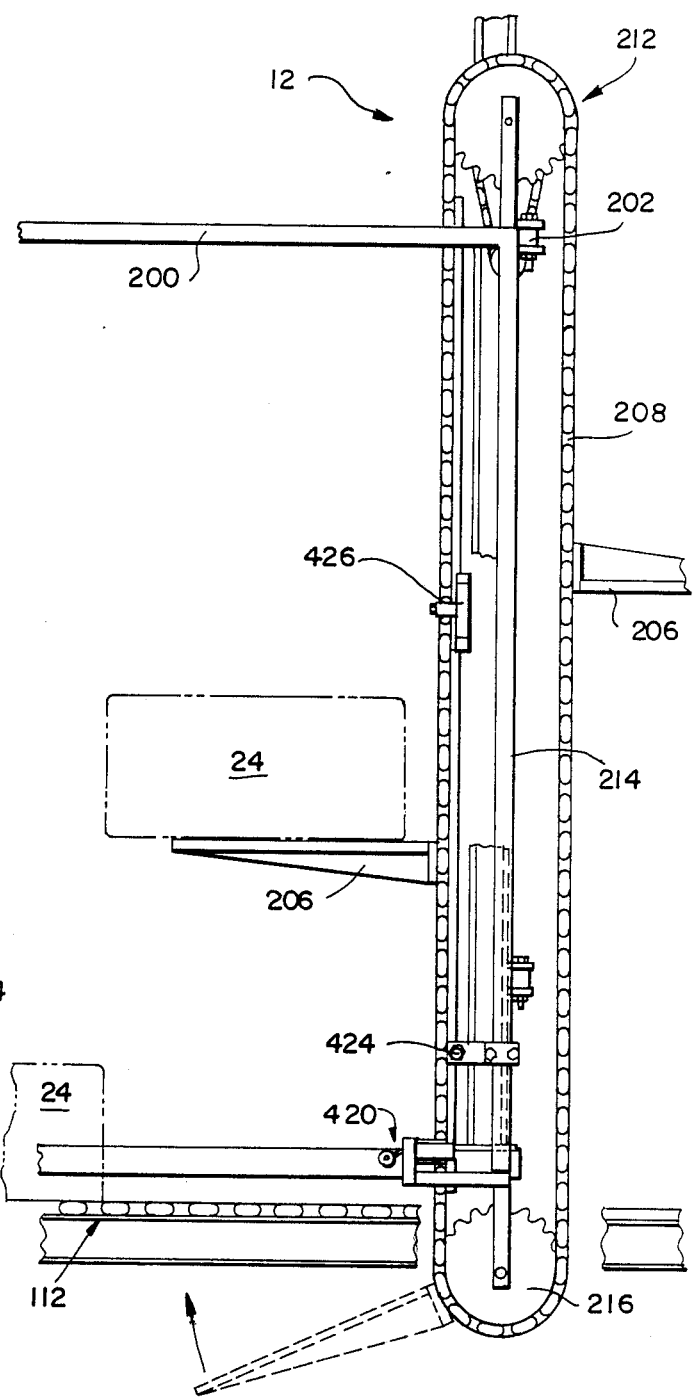
FIG. 27 is a left side elevation of the elevator apparatus.

As shown in FIGS. 24–29, the elevator mechanism 12 includes a frame 200 which is pivotally mounted at 202 to one of the vertical support members 182 of the upper carriage 154 and is pinned at 204 to the elevator support arm 188. As is illustrated in FIG. 26, upon removal of the pin from the elevator pin joint 204, the elevator mechanism 12 may be pivoted about connection 202 for safe over-road transportation of a truck containing the present invention, upon properly constraining the elevator in its pivoted position. For over road transportation, the elevator paddles 206 are aligned vertically so as to reduce any hazard they may present. In addition, support member 200 pivots vertically about pivot joint 202 for over road transportation.

The elevator mechanism 12 includes at least two lifting paddles 206, connected to a pair of continuous chains 208, driven by a hydraulic motor 210 and a conventional drive mechanism 212, such as a chain and sprocket mechanism or a drive belt.

When in the operative position, the elevator mechanism 12 will be positioned between the chain members 114 of the second conveyor means 112. As such, the paddle means 206 are transported about sprocket means 216 and between the parallel chains 114 of the second conveyor means 112 to lift the box or carton from the second conveyor means 112.

Referring to FIGS. 24 and 30-38, a palletizer 14 having a palletizer frame 252, including a primary frame member 254, is suspended from the tension members 250 along its right and left longitudinal sides so as to enable the palletizer to move in the vertical direction. The tension members 250 are connected to a hydraulic cylinder 256 through pulley means 258 such that the vertical position of the palletizer may be varied by expanding or contracting the hydraulic cylinder 256. Vertical movement of the palletizer frame 252 is further aided by guide rollers 266 running within the carriage vertical support members 182 on the left and right sides of the frame 252 as shown in FIGS. 30 and 35-36.

Supported by the palletizer frame 252 is a transfer head 260, a pre-stacking area palletizer false floor 262, a tamping bar 264 and various power and control mechanisms as hereinafter described for each of the above-mentioned components.

Roller wheels 268 are mounted to the right and left ends of the palletizer false floor 262 for retraction and extension along the curvilinear path of the floor track 270, which is mounted to the palletizer frame 252. To further facilitate its retraction along track 270, the preferred embodiment of the palletizer false floor 262 includes three pivotally connected sections used as a prestacking area.

The first palletizer false floor section 272 includes a frame member 274 and a plurality of rollers 276 rotatably fixed therein. The remaining two sections 278 of the palletizer false floor 262 have a uniformly smooth surface and are pivotally connected in series to the first false floor section 272 similar to an overhead door, to permit relative rotation of the false floor sections upon retraction of the false floor 262 along the floor track 270.

Carton brakes 282 are placed above the rollers of the first section 272 of the palletizer false floor to space the cartons or boxes 24 delivered thereto by the transfer head 260 along the palletizer false floor which is used as a prestacking area. These carton brakes act to remove a portion of a box or carton 24 from the first section of the false floor 272 and may be selectively positioned over any number of rollers 276 at any selected position on the false floor first section 272.

Similarly, pivoting carton stops 280 act to inhibit the boxes or cartons 24 from returning towards the transfer head 260 (i.e. movement of the cartons to the left in FIGS. 37 and 38) and to inhibit undesired movement of the cartons while resting on the first section 272 of the palletizer false floor 262, while allowing the boxes or cartons 24 to freely move away from the transfer head (i.e. to the right in FIGS. 37 and 38).

A pivoting stop 281 is connected to the right side of the palletizer frame 252 and extends longitudinally along the truck body. The stop 281 acts to prevent boxes or cartons from falling off the right side of the truck prior to being deposited onto the pallets 20 or previously constructed stacks as hereinafter described. When the palletizer moves longitudinally along the truck body away from a full column of stacked boxes and cartons, the stop 281 acts to pivot up and out of the way as the palletizer floor drops, thereby preventing damage or injury to the stacked boxes or cartons.

Figure 40:
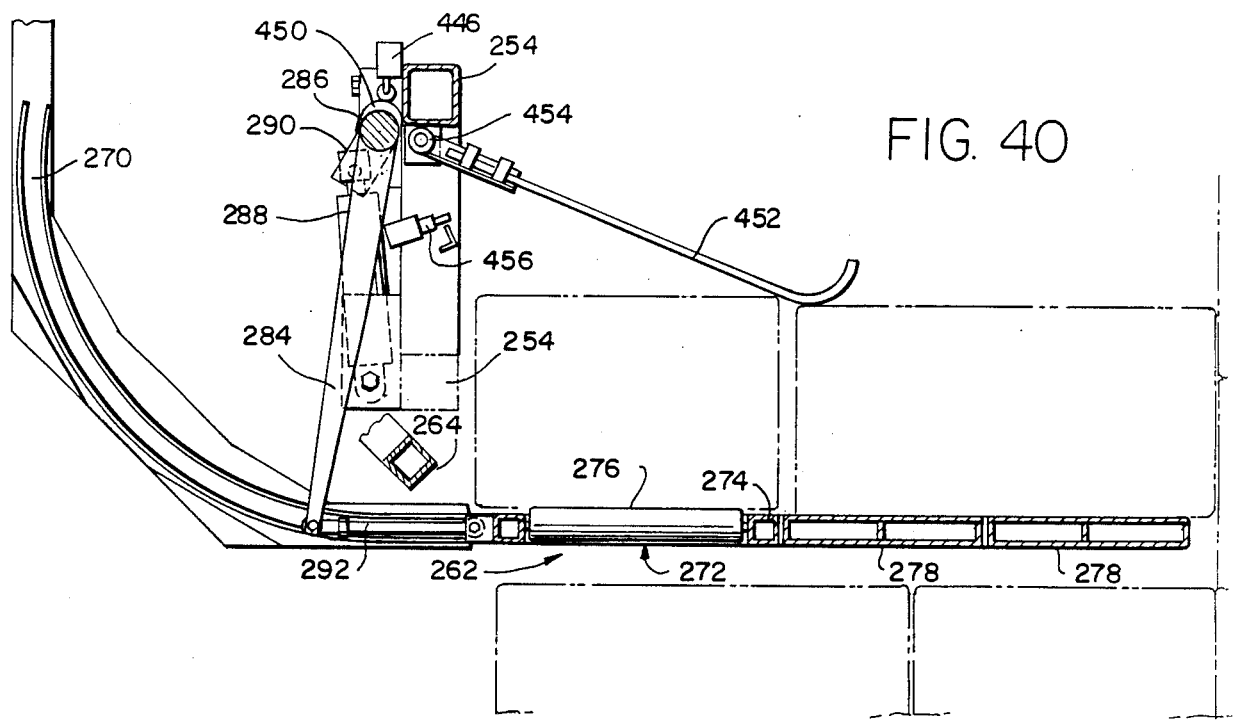
FIG. 40 is a cross sectional view taken substantially along line 40—40 of FIG. 39.
Figure 39:
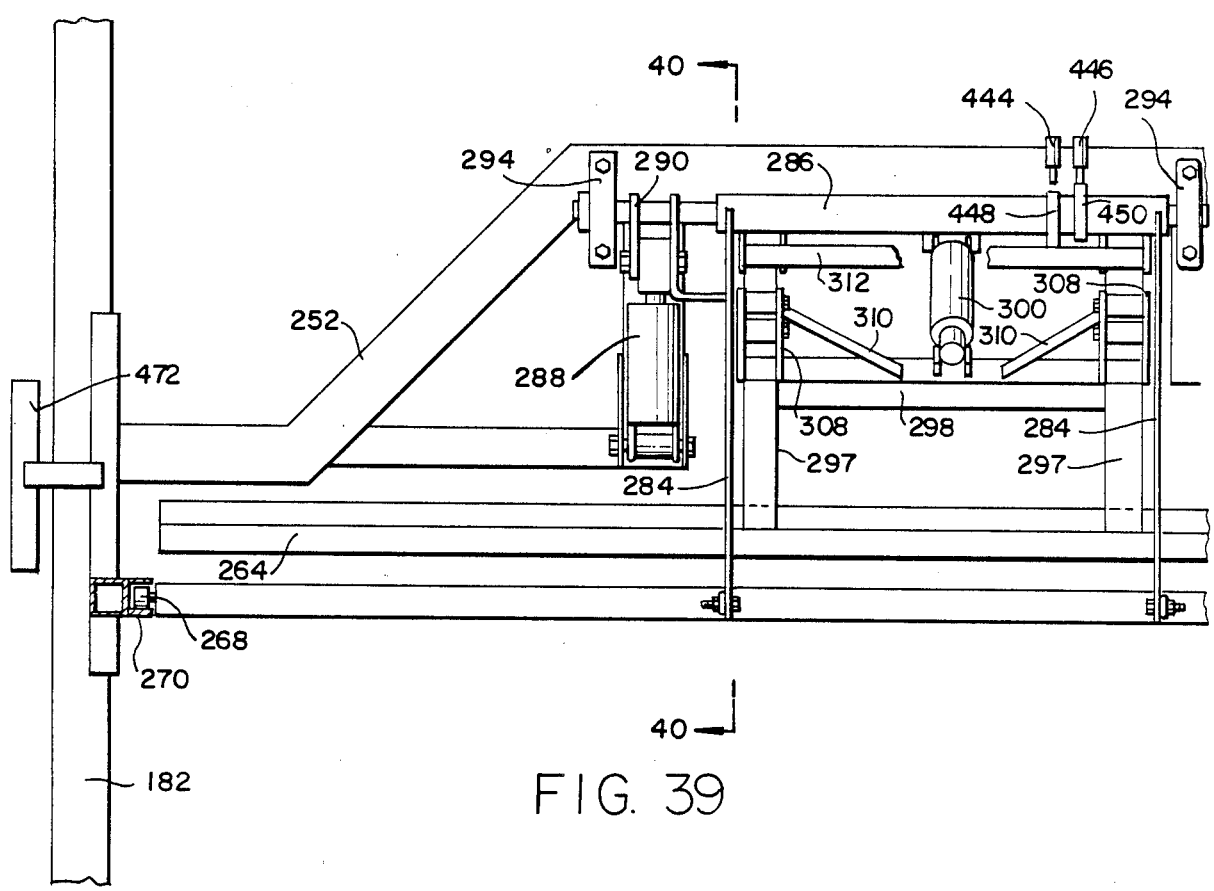
FIG. 39 is a front view of the right portion of the palletizer.

As shown most clearly in FIGS. 39 and 40, retraction of the palletizer false floor 262 is accomplished by pivoting of the pair of parallel retraction linkages 284 about the retraction shaft 286 which is supported by bearings 294 along its length. The false floor is lifted by a hydraulic cylinder 288 which is connected to retraction shaft 286 by power linkage 290. The retraction linkages 284 are connected to the palletizer false floor 262 through pivoting connecting rods 292. Thus, expansion of hydraulic cylinder 288 acts to pivot the retraction linkages 284 about the retraction shaft 286, thereby lifting and retracting the palletizer false floor 262.

A tamping bar 264 is provided for depositing a row or a section of boxes or cartons 24 assembled in the pre-stacking area of the palletizer false floor 262 to the pallets 20 or the previously stacked boxes or cartons and to further insure that the boxes or cartons are tightly and properly packed before fully removing the boxes or cartons from the pre-stacking area. As shown most clearly in FIGS. 33, 39 and 41, the tamping bar 264 is attached to a tamping bar support frame 296, including two longitudinal members 297 and at least one cross member 298.

A hydraulic cylinder 300 positioned between the palletizer primary frame member 254 and the tamping bar support frame cross member 298 is provided to extend the tamping bar 264 upon expansion of the hydraulic cylinder 300. Extension of the tamping bar 264 is accomplished by the pivoting of the pair of angle linkages 302 and the pair of secondary tamping bar linkages 304, the first ends of which are pivotally connected to a pair of plates 306 which extend from the primary palletizer support member 254. Similarly, the second ends of both of the angle linkages 302 and both of the secondary tamping bar linkages 304 are connected to a pair of parallel plates 308 which extend from each lateral end of the tamping bar support frame 296.

Support struts 310 extend between the cross member 298 and the parallel plate extensions 308 in order to provide additional structural support. Similarly, a cross member 312 extends between the two secondary tamping bar linkages 304. Thus, upon expansion of hydraulic cylinder 300, the angle linkages 302 and the secondary linkages 304 pivot about their connections to first plates 306 and extension plates 308 to enable the tamping bar 264 to extend out (i.e. along the longitudinal direction of the truck body) as most clearly illustrated in FIGS. 33 and 41.

As shown most clearly in FIGS. 33 and 42–49, a transfer head 260 is provided for transferring boxes or cartons 24 from the paddles 206 of the elevator onto the first section 272 of the palletizer false floor 262. As is shown most clearly in FIGS. 42 and 43, a receiving extension 314 having a pair of guide rollers 316 thereon extends from the left side of the palletizer support frame 252.

The guide rollers 316 are positioned so as to provide a receiving opening for the boxes or cartons 24 being lifted up the elevator shaft by the elevator 12 at the level of the palletizer false floor 262. So constructed, the guide rollers 316 act to laterally reposition any box or carton being raised by an elevator paddle 206 prior to the time the box or carton reaches the level of the palletizer false floor 272 for removal by the transfer head 260. In addition, the guide rollers 316 also enable the transfer head 260 to easily and smoothly remove the boxes from the elevator paddle 206.

Figure 42:
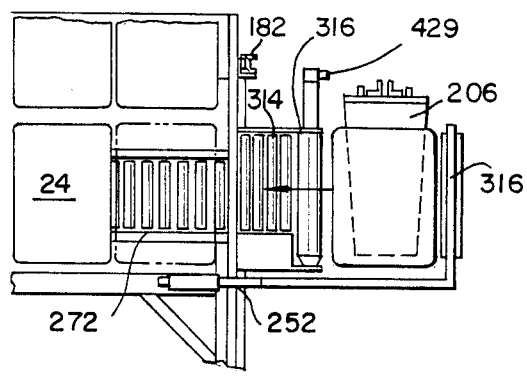
FIG. 42 is a a plan view of the carton alignment mechanism showing the cartons aligned in the longitudinal direction.
Figure 43:
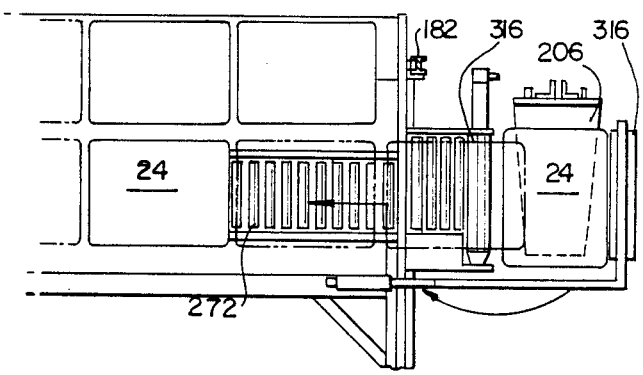
FIG. 43 is a plan view showing the carton delivery when the cartons are rotated and stacked in the transverse direction.

The above-described benefits accrue whether the cartons or boxes are to be aligned along the bed 19 longitudinally (as shown in FIG. 42) or transversely (as shown in FIG. 43). To load boxes or cartons as shown in FIG. 42, it is necessary to have a transfer head 260 which will merely transport the boxes from the elevator paddle to the false floor 262. To stack the boxes 24 transversely, however, as shown in FIG. 43, it is necessary to have a transfer head 260 which will rotate the boxes 90° prior to delivering them to the palletizer false floor 262 pre-stacking area.

Figure 44:
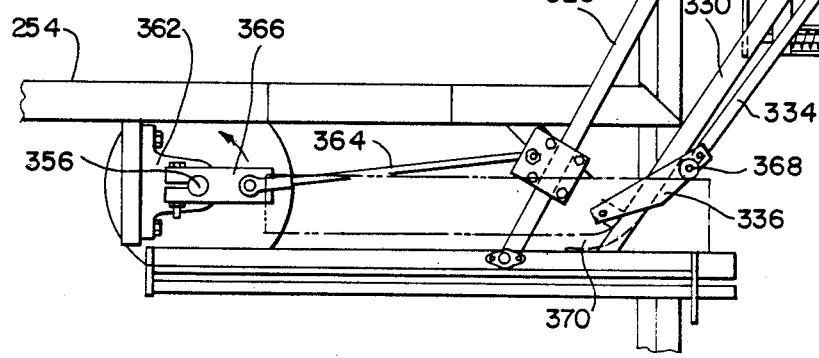
FIG. 44 is a plan view of the transfer head in its receiving position.
Figure 45:
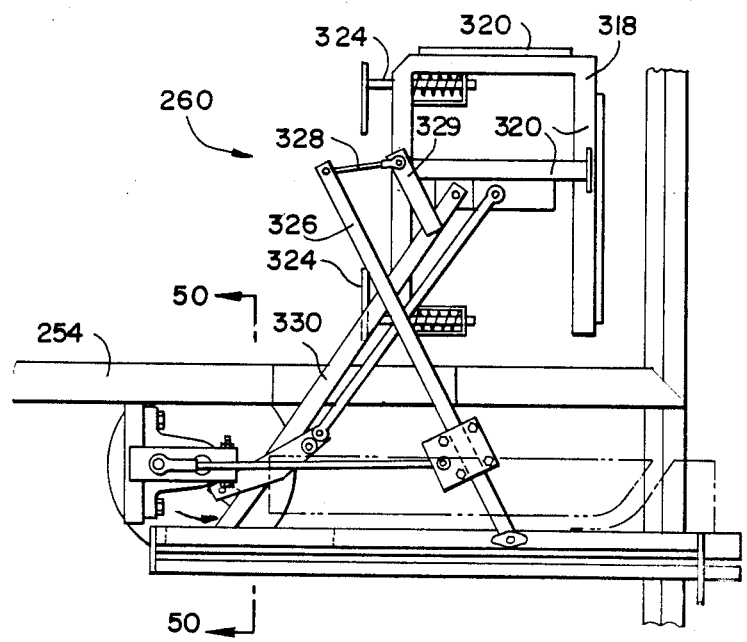
FIG. 45 is a plan view of the unrotated transfer head in the deposit position.

As best illustrated in FIGS. 44–47, the transfer head 260 reciprocates from the receiving position illustrated in FIG. 44 and the transfer position illustrated in FIG. 45. As hereinafter described, upon receiving a signal from the microprocessor control unit 422, the rotation mechanism of the transfer head 260 acts to rotate the box 90° for stacking in the transverse configuration illustrated in FIGS. 46–47. Rotation of the box or carton 24 is aided by guide rollers 316 and receiving extension 314.

As most clearly shown by FIGS. 44–49, the transfer head 260 includes a structural frame 318 which has an intermediate cross member 320. Engagement flanges 322 extend from the transfer head frame 318 from at least one longitudinal and one transverse side thereof. In order to provide additional gripping of the boxes or cartons 24 while simultaneously permitting the transfer head 260 to accommodate variations in the size of the boxes or cartons being transferred, adjustable spring loaded engagement flanges 324 are also provided along at least one edge of the transfer head frame 318.

A fixed pivoting member 326 is connected to the transfer head frame 318 through a pivoting connecting rod 328. In addition, a slidable pivoting member 330 extends between the intermediate cross member 320 of the transfer head frame 318 and the slider 332. A rotation linkage 334 is also connected between the intermediate cross member 320 of the transfer head frame 318 and a second rotation linkage 336 pivotally connected to the slider member 332. Additionally, a fixed the link 329 is connected between pivoting connecting rod 328 and slidable pivoting member 330.

In the preferred embodiment, at least three transfer head tracks 338 are aligned laterally across the bed 19 and fixed at their ends to the transfer head support frame 318 and transfer head support frame end platform 339. Three roller wheels 340 are positioned so as to move along the transfer head guide tracks 338. Support bands 319 are attached along the transfer head guide tracks 338 at intermediate positions to provide additional support.

In addition to the reciprocating motion hereinabove described, the transfer head 260 also pivots vertically about the transfer head pivot axis 342 in order to allow the transfer head 260 to pivot clear of boxes and containers in the pre-stacking area prior to returning to the initial receiving position illustrated in FIG. 44. A damping member 344 is mounted between the transfer head support frame end platform 339 and the palletizer frame 252. Adjustable pedestal members 346 extend from the palletizer frame 252 to provide a stop for the transfer head support frame end platform 339 upon returning to its non-pivoted position. The transfer head 260 is in the deposit position when it has reached the end of its lateral or transversal movement and is in the pivoted position so as to be clear of the box or cartons 24 for its return cycle.

Figure 50:
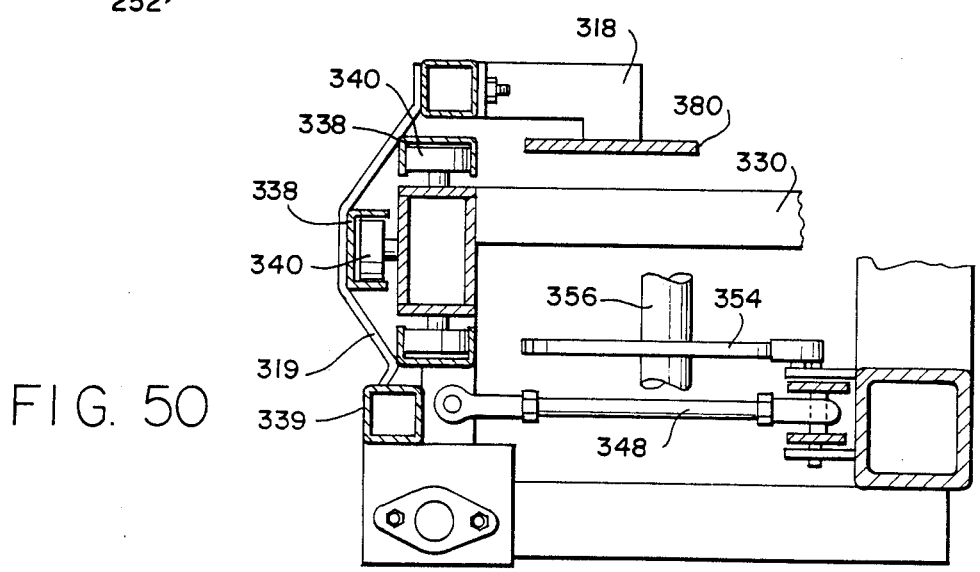
FIG. 50 is a cross sectional view of the transfer head mechanism illustrating the pivoting and sliding mechanisms.

As shown most clearly in FIG. 50 and 51, the pivoting motion of the transfer head 260 is accomplished by a push rod 348 acting through a rocker arm 350 having a roller 352 connected to one end. A cam 354 is fitted about transfer head drive shaft 356 and is driven by a hydraulic motor 358 through drive means 360 such as a chain and sprocket means or a drive belt. The pivoting cam 354 is constructed so as to activate the pivoting motion of the transfer head by applying force to the rocker arm roller 352.

Figure 47:
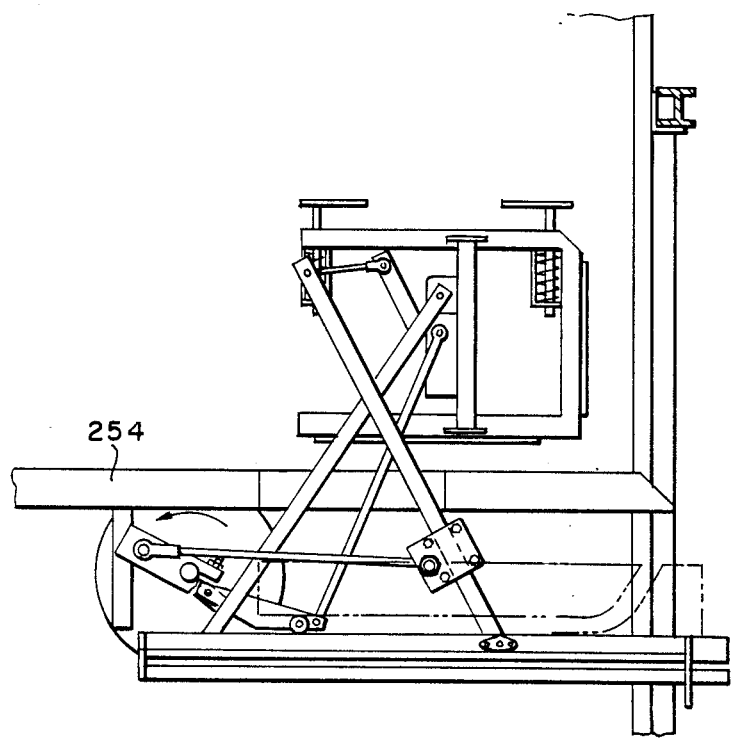
FIG. 47 is a plan view of the transfer head in the rotated position just prior to reaching the deposit position.
Figure 48:
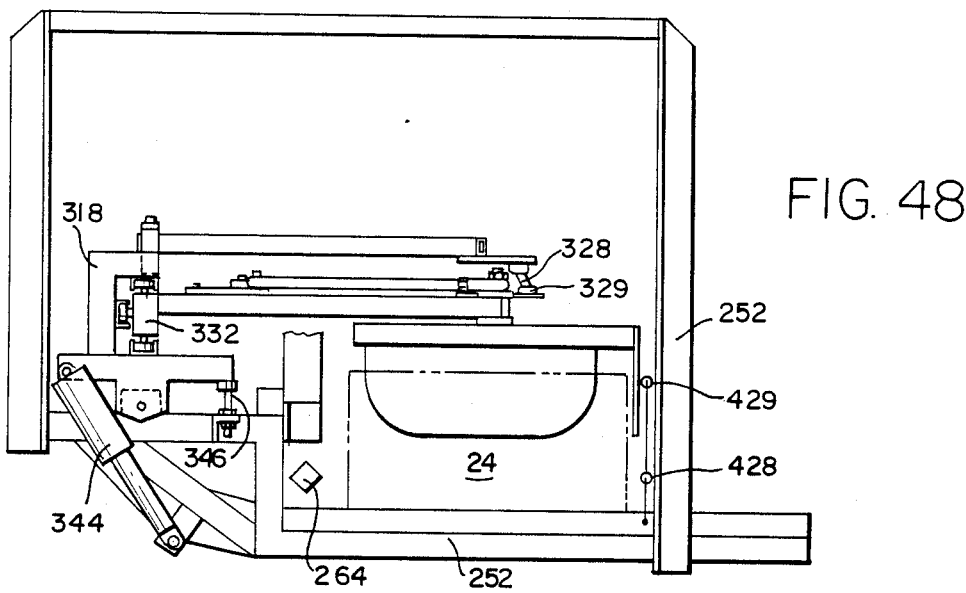
FIG. 48 is a left side view of the transfer head mechanism.

The transfer head drive shaft 356 is suspended along its length by bearings 362 which are mounted to the palletizer frame 252. The transfer head connecting rod 364 extends between the transfer head fixed pivoting member 326 and the transfer head drive linkage 366. Thus, the lateral or transverse sliding movement of the transfer head 260 is driven through the same hydraulic motor 358 and drive shaft 356 as activates the pivoting motion of the transfer head 260 as hereinabove described. Since the transfer head drive shaft 356 drives both the transfer head 260 translational movement and the transfer head 260 pivoting movement, it is possible to arrange the pivoting cam 354 so as to produce pivoting movement of the transfer head 260 only when the head is in its pre-pivoting deposit position as illustrated in FIG. 47.

Figure 46:
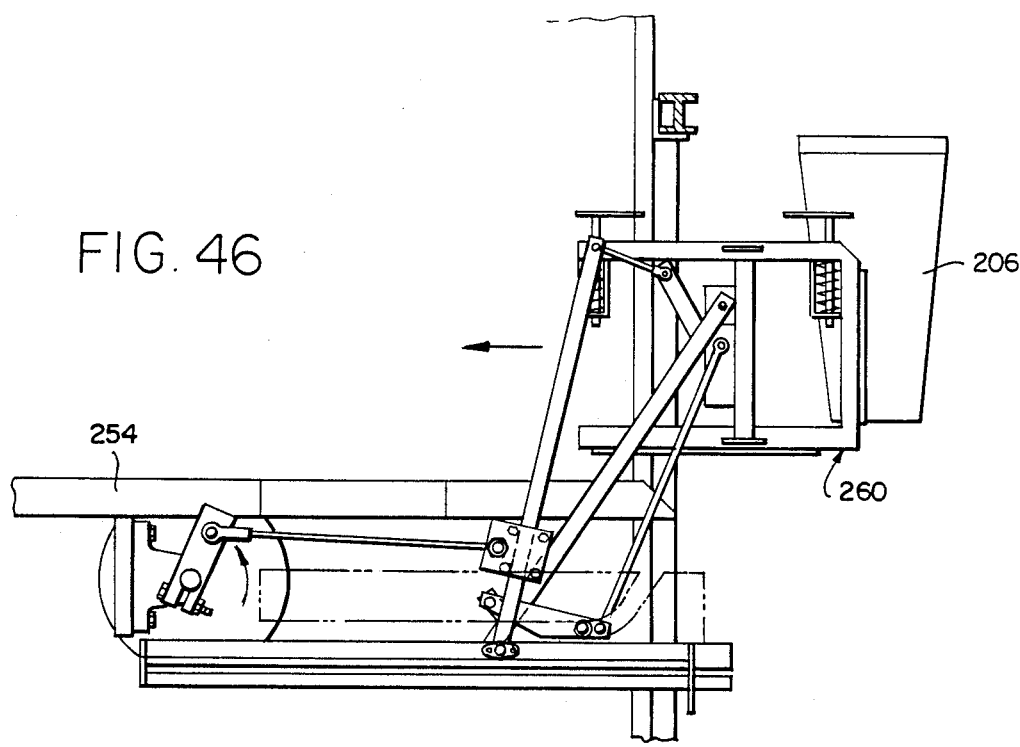
FIG. 46 is a plan view of the transfer head just after receiving and rotating a carton for stacking in the transverse configuration.

Rotational movement of the transfer head 260 is provided by engagement of rotational cam roller 368 connected to the second rotation linkage 336 and the rotational track 370 in cover plate 380. As is best illustrated by FIGS. 46 and 47, rolling engagement between the rotational cam roller 368 and the rotational track 370 results in the rapid rotation of the transfer head 260 and any box or container 24 gripped thereby. As will be understood by those skilled in the art, by varying the configuration of the rotational track 370, it is possible to achieve a full 90° rotation of the transfer head 260 with only a minimal amount of transverse movement (i.e. to the left in FIGS. 46 and 47) by the transfer head 260. Such rapid rotation may be desirable where, as in the preferred embodiment of the present invention, limited space and clearance is available for rotation of the boxes or cartons by the transfer head 260.

Selective engagement of the rotational cam roller 368 and rotational track 370 is controlled through pivoting rocker gate 372. In the preferred embodiment, an electronic solenoid and a relay 374 is connected to the right side of the pivoting rocker gate 372 to selectively open and close the pivoting rocker gate 372. A tension member 376 such as a spring acts to bias the pivoting rocker gate 372 towards the closed position (shown in solid lines in FIG. 52) until a sufficient force is provided by the electronic solenoid 374 to overcome the bias.

Thus, when it is desired to stack the cartons or boxes 24 longitudinally along the pallets 20 positioned on the bed 19 of the present invention, the pivoting rocker gate 372 is closed such that the rotational cam roller 368 rolls over the top 378 of the pivoting rocker gate 372 along the edge 381 of the cover plate 380. Alternatively, where it is desired to rotate the box or container 90° through the transfer head 260, upon activation of the electronic solenoid 374, the pivoting rocker gate 372 ill open and the guide surface 379 of the pivoting rocker gate 372 acts to direct the rotational cam roller 368 into the rotational track 370. It is apparent from the above that rotation of more or less then 90° may also be accomplished depending on the selected distance D between the leading edge 381 of the cover plate 380 and rotational track 370.

To facilitate the unloading of the truck bed 18, an alignment apparatus 382 is employed herewith. The alignment apparatus 832 includes a male member 384 and a female member 386. In the preferred embodiment, the male member 384 is attached to the truck bed 18 while the female member 386 is connected to the rear end of a transportation truck 388. The truck beds are aligned laterally through at least two inclined members 396 connected to the transloader truck bed 18 and the transport truck 388.

Hydraulic cylinder means 390 including a hook means 392 to interengage with a hook means 394 connected to the transport truck 388 is used to maintain the appropriate aligned conditions for transfer. Upon applying a pulling force through the cylinder 390 to the transport truck hook member 394, the alignment apparatus 382 acts to equalize the vertical and lateral position of the bed of the transport truck 388 with the transloader bed 19 through the male and female members, 384 and 386, respectively, and the inclined members 396.

Figure 24:
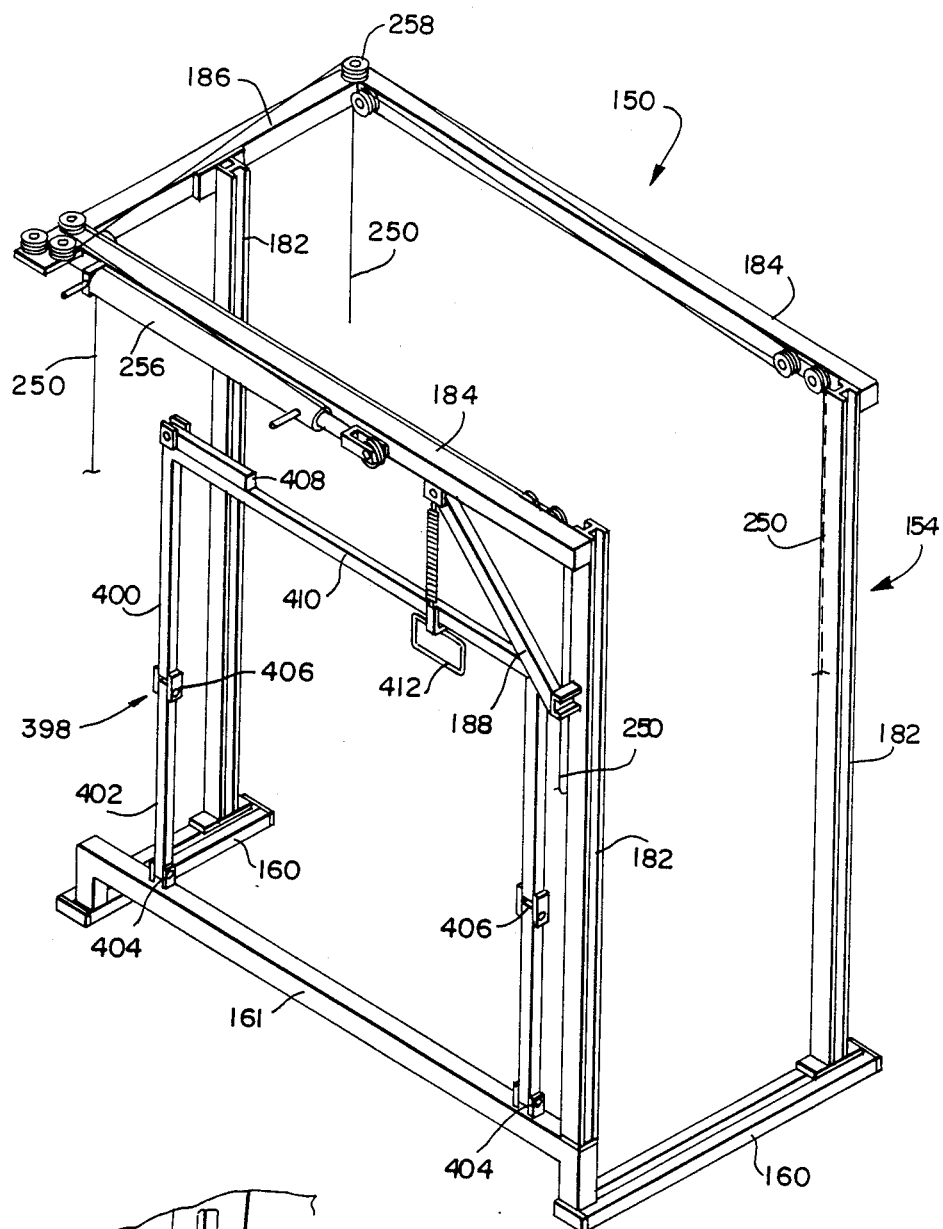
FIG. 24 is a perspective view of the carriage support frame.

As shown in FIGS. 18, 24 and 54-55, a push bar frame 398 having an upper portion 400 and a lower portion 402 is pivotally mounted at 404 to the carriage lower support frame transverse member 161. As shown in FIG. 24, the upper portion 400 of the push bar frame 298 is pivotally connected at 406 to the lower portion 402. A pair of push bar extenders 408 are pivotally mounted to the cross member 410 of the upper portion 400 of the push bar frame 398.

A spring hook 412 fixedly connected at one end to one of the upper carriage transverse members 184 may be used to selectively retain the push bar frame in it stored position as is best illustrated in FIG. 24.

Figure 55:
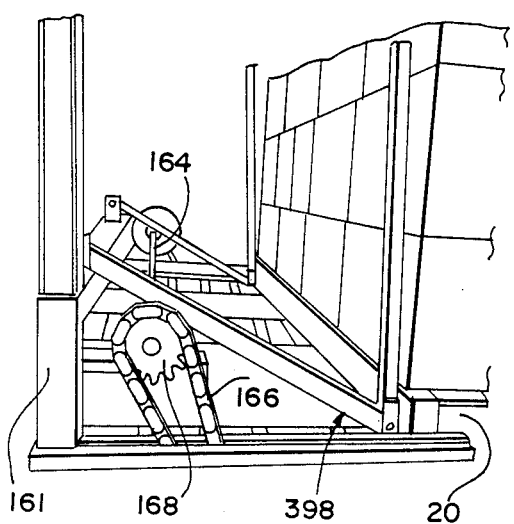
FIG. 55 is a perspective view of the push-bar offloading apparatus in the pushing off position.

When it is desired to unload the loaded bed 19, the palletizer frame 252 is raised to its highest vertical position by tension members 250 and the carriage 150 is moved to its full forward transverse position (i.e. next to the truck can in figure 2). Upon releasing the push bar 398 from the spring hook means 412 which retains it in its stored position, the lower portion 402 of the push bar frame 398 may be positioned against the edge of filled pallets 20 as illustrated in FIG. 55.

After engaging the transport truck 388 with the truck 16 through the alignment apparatus 382 as hereinabove described, the carriage 150 may be driven towards the longitudinal rear of the truck 16 through drive shaft 164, chain 166, and sprocket 170 as described hereinabove. Such action will slide the filled pallets 20 over the rollers 22 connected to the bed 19 of the present invention and onto the bed of the transport truck 388.

Upon reaching the longitudinal rear of the bed 19, the carriage 150 may be moved back towards the longitudinal front of the truck 16 such that the upper portion 400 of the push bar frame 398 may now be positioned against the pallets 20 to provide the capability for further pushing the pallets onto the bed of the transport truck 388. Where necessary, the push bar frame extends 408 may also be extended so as to push the filled pallets 20 even further onto the bed of the transport truck 388.

In operation, the preferred embodiment of the present invention loads and stacks boxes or cartons 24 in columns by depositing sections of boxes or cartons 24, compiled in the prestacking area false floor 262, on to the truck 6. A section of boxes 24 is comprised of rows of boxes or cartons 24 which have been assembled on the preassembly area and are ready to be deposited onto the pallets 20. For purposes of example only, when employing alternative stacking of standard boxes or cartons of lettuce, a row will consist of either five boxes or cartons 24 arranged longitudinally or four boxes or cartons 24 arranged transversely. As such, a section of boxes or cartons 24 would consist of a row of longitudinally arranged boxes or cartons and a row of transversely arranged boxes or cartons.

Upon desiring to load and stack boxes or cartons containing agricultural products and aligned in an agricultural field onto the bed 19 of the present invention, the truck 16 is driven into the agricultural field such that the loader 10 is substantially aligned with the boxes or cartons 24 containing the agricultural products. The truck 16 is then driven towards the cartons or boxes 24 whereupon the loader 10 is permitted to initiate the lifting and loading operation.

Variations in the lateral position of the boxes or cartons 24 relative to the truck may be accommodated as hereinabove described through lateral movement of the lifting apparatus and pivoting of the first conveyor means 26 as hereinabove described. Similarly, variations in box or carton 24 size may be accommodated by the lifting apparatus pivoting frame 52.

After being deposited onto the first conveyor means 26 by the endless belt means 32 of the lifting apparatus 29, the boxes or cartons 24 are subsequently transferred to the second conveyor means 112. The second conveyor means 112 then transports the boxes to the elevator means 12.

The operation of the transloader may be controlled either manually or by a microprocessor control unit (MCU) 422. A second trip switch 420 is positioned on the front side of the lower portion of the elevator structural frame 214 such that a box or carton 24 will activate the elevator trip switch 420 which is electrically connected to the MCU 422. Actuation of the elevator trip switch 420 provides the MCU 422 with a signal when there is a box or carton 24 in the elevator receiving position (i.e., in a position ready to be lifted by an elevator paddle 206).

A first proximity sensor 424 is fixedly secured to the left side of the elevator structural frame 214. A first metal tab member 426 is selectively positioned on the elevator drive chain means 208a nearest the first proximity sensor 424. The first proximity sensor 424 is also electrically connected to the MCU 422 such that when the first metal tab member 426 passes the first proximity sensor 424, a signal is provided to the MCU 422 that an elevator paddle 206 is ready to lift a box or carton 24 from the elevator receiving position.

If the MCU 422 has not received a signal from the elevator trip switch 420 that a box or carton 24 is in the elevator receiving position, the MCU 422 stops the elevator drive mechanism 212 until a signal is received from the elevator trip switch 420 indicating that a box or container 24 is in the elevator receiving position.

Second conveyor means 112 does not stop even if boxes or cartons 24 backup or accumulate on second conveyor means 112 as a result of the stopping of the elevator. The chain or belt configuration of second conveyor means 112 is, as known to those skilled in the art, designed such that the belt or chain 114 will slide beneath any accumulated boxes or cartons 24, merely applying a gentle force on the boxes or cartons to ensure that they are transported to the elevator ready position.

Figure 49:
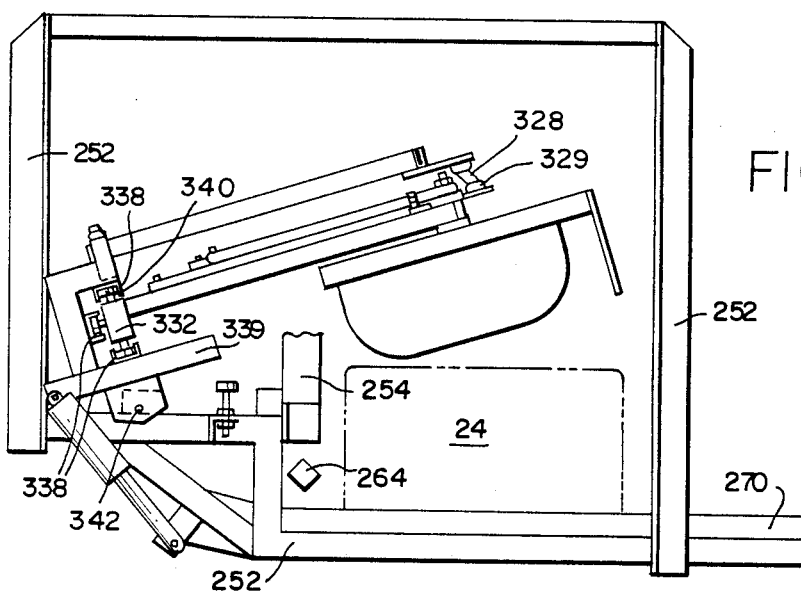
FIG. 49 is a left side view of the transfer head in its pivoted deposit position.

As shown in FIGS. 42, 43 and 49, second and third proximity sensors 428 and 429, respectively, are positioned on the left side of the palletizer frame 252 near the guide rollers 316. A second metal tab member 430 is connected to the right elevator chain drive means 208b (i.e. the elevator drive chain nearest the truck 16). As will be apparent to those skilled in the art, the first proximity sensor 424 and the second and third proximity sensors 428 and 429, respectively, must be positioned on opposite sides of the elevator chain drive mechanism hereinabove described in order to avoid incorrect signals from the first and second metal tab members 426 and 430, respectively.

As the elevator paddle 206 approaches the level of the palletizer false floor 162, the second proximity sensor 428 provides the MCU 422 with a signal to slow down the vertical movement of the elevator motor 210. When the second metal tab member 430 passes the third proximity sensor 429, the MCU 422 stops the elevator motor 210 until the MCU 422 receives a signal from the first roller trip sensor 432 as hereinafter described that the transfer head 260 is clear of the elevator lifting path.

The MCU 422 is provided with information as to the longitudinal position of the carriage 150 through the first trip sensor 178 attached to the left side of the lower carriage frame 160, as illustrated in FIG. 19. Trip plates 180 positioned along the longitudinal length of the truck bed 18 act to actuate the first trip sensor 178 at preselected loading positions along the longitudinal length of the bed 19.

As hereinabove described, the rotation of the transfer head 260 depends on the position of rotation cam 372. Depending upon the desired orientation of the boxes or cartons, the MCU 422 may selectively operate the transfer head electronic solenoid 374 to control the orientation of the box or carton 24 being deposited by the transfer head 260.

As illustrated in FIG. 53, the MCU 422 is also provided with electronic signals from a third 432, a fourth 434 and a fifth 436 roller trip sensor, each of which rides on a third 438, a fourth 440 and a fifth 442 cam member, respectively. Each of the cam members are fitted about the transfer head drive shaft 356. As will be understood by those skilled in the art, the third cam member 438 is positioned on the transfer head drive shaft 356 so as to actuate the third roller trip sensor 432 when the transfer head 260 is clear of the lifting path of the elevator means 12.

Similarly, the fourth cam member 440 is positioned on the transfer head drive shaft 356 so as to actuate the fourth roller trip sensor 434 when the transfer head 260 has deposited a box or carton 24 into the pre-stacking area of the palletizer false floor 262 and pivoted clear of the boxes or cartons 24 as hereinabove described. The fifth cam member 442 is positioned on the transfer head drive shaft 356 so as to actuate the fifth roller trip sensor 436 when the transfer head 260 is in its fully extended receiving position, shown in FIG. 44.

Upon receiving a signal from the third roller trip sensor 432, the MCU 442 permits the elevator hydraulic motor 210 and drive mechanism 212 to operate the elevator means 12 at full speed, thereby cancelling the stop signal provided by the third proximity sensor 429.

As shown in FIGS. 39 and 40, sixth 444 and seventh 446 roller trip sensors are actuated by sixth 448 and seventh 450 cam members positioned about the retraction shaft 286. As such, the sixth cam member 448 is positioned so as to actuate the sixth roller trip sensor 444 when the false floor 262 is in the extended position. Similarly, the seventh cam member 450 actuates the seventh roller trip sensor 446, to signal the MCU 442 when the false floor 262 is in the fully retracted position.

A pivoting wand 452 is pivotally mounted 454 to the palletizer frame primary member 254 as illustrated in FIG. 40. An eighth trip sensor 456 is positioned beneath the pivoting wand 452 so as to be actuated by downward movement of the pivoting wand. The length of the wand 452 must be selected as follows.

First, the wand 452 must be of sufficient length such that it only actuates the eighth trip sensor 456 when the end of the wand clears the previously deposited section of boxes or cartons on the truck bed 18 as herein described. So constructed, the wand actuated trip sensor 456 provides the MCU 422 with a signal that the palletizer false floor 262 may be extended as it will clear of the below-adjacent level of boxes or cartons 24 stacked on the bed 19 of the present invention.

In addition, the wand 452 must also be of sufficient length such that when the carriage moves longitudinally along the bed 19 as a result of assembling and stacking a full column of boxes or cartons onto the bed 19 as hereinafter described, the wand actuated trip sensor 456 signals the MCU 422 that the palletizer frame is clear of the assembled column of boxes or cartons 24 on the bed 19, such that the MCU 422 may begin to lower the palletizer frame 250 as described herein, in preparation for resuming the arranging, stacking and palletizing operations of the palletizer.

For purposes of example, for use with standard boxes or cartons 24 of lettuce, it is expected that the wand 452 will be approximately 18 inches in length in the preferred embodiment of the present invention.

Movement of the tamping bar 264 is controlled as follows. As shown in FIG. 56, a ninth rotation trip sensor 458 and a tenth rotation trip sensor 460 are positioned to be actuated by a ninth cam member 462 and a tenth cam member 464, respectively. Each of the cam members are positioned about tamping cam shaft 466 integrally connected to one of the secondary tamping links 304.

In addition, an eleventh trip sensor 468 and a twelfth trip sensor 470 are connected to the palletizer frame 254 through brackets 469 and 471, respectively, so as to extend into the arc of rotation of the tamping bar support cross members 312 and 298, respectively. Under normal operation of the palletizer, the MCU 422 retains the tamping bar 264 in its fully withdrawn or home position as illustrated in solid lines in FIG. 41. When the tamping bar 264 is in the home position, the MCU 422 receives an electronic signal from the eleventh trip sensor 468 as continually actuated by a tab 473 connected to cross member 312.

When the MCU 422 determines that a full row of boxes or cartons 24 is present in the pre-stacking area of the false floor 262, the MCU program directs the tamping bar 264 to extend to a preselected position. If the row of boxes or cartons 24 is arranged longitudinally, the tamping bar 264 will extend until the MCU 422 receives a signal from the ninth roller trip sensor 458, referred to as the first extended position. If the row of boxes or cartons 24 is arranged transversely, the tamping bar 264 will extend until the MCU 422 receives a signal from the tenth roller trip sensor 460, referred to as the second extended position.

For purposes of example, where the present invention is used for loading, stacking and arranging standard boxes or cartons of lettuce, the ninth cam member 462 is arranged to actuate the ninth roller trip sensor 458 when the tamping bar 264 has extended approximately 18 inches. Similarly, the tenth cam member 464 is arranged to actuate the tenth roller trip sensor 460 when the tamping bar 264 has extended approximately 24 inches.

As a result of the above described extension of the tamping bar 264, the row of boxes or containers 24 will be in contact and substantially adjacent to the tailgate 25 of the transloader bed 19 or a previously arranged section of boxes or containers 24.

Subsequently, upon tabulating the electronic signals from the fourth roller trip sensor 434 and determining that a complete second row of boxes or cartons 24 has been assembled in the pre-stacking area of the palletizer false floor 262, thereby completing a section of boxes or cartons 24, the MCU 422 again acts to extend the tamping bar 264. This time, however, since a complete section of boxes or cartons 24 is now present on the pre-stacking area of the false floor 262, the MCU 422 only extends the tamping bar 264 until it receives a signal from the twelfth trip sensor 470, known as the third extended position. As illustrated by FIG. 41, the twelfth roller trip sensor 470 is actuated by tamping bar cross member 298 as it moves along its arc of rotation as the tamping bar 264 is extended.

At this point, the MCU 422 maintains the tamping bar 264 in the third extended position until the MCU 422 receives a signal from the seventh roller trip sensor 446 indicating that the palletizer false floor 262 has been fully retracted. The tamping bar 264 is held in the third extended position to ensure that the just-deposited section of boxes and cartons is fully and properly packed on the pallets 20 and to prevent a condition known in the industry as "flap-to-flap". "Flap-to-flap" occurs when a flap of one box becomes aligned with the flap of an above or below adjacent box. If the "flap-to-flap" condition is not corrected prior to stacking additional cartons or boxes 24 onto the just deposited section of cartons or boxes 24, it is extremely difficult if not impossible to correct without unloading the entire truck.

As a result of the retraction of the palletizer false floor 264, the section of assembled boxes or cartons 24 are allowed to drop the short distance between the level of the palletizer false floor 262 and the below adjacent level of the pallets 20 positioned on the bed 19, or the tops of the below adjacent section of boxes or cartons 24 previously stacked by the palletizer.

Again, for purposes of example only, when loading, arranging and stacking standard boxes or cartons of lettuce, the third extended position is an extension of approximately two inches. Since the amount of movement of the tamping bar 264 between the home and third extended positions is small, the eleventh 468 and twelfth 470 rolling trip sensors are mounted on the palletizer frame and are actuated by the tamping bar cross members 312 and 298, respectively so as to provide the necessary precision required to track such a small movement.

Upon receiving the above-mentioned signal from the seventh roller trip sensor 446 that the false floor 262 is in the fully retracted position, the MCU 422 retracts the tamping bar 264 to the home position. The MCU 422 then engages in a second tamping action by again extending the tamping bar 264 to the third extended position and withdrawing it to its home position. This second tamping action ensures that the boxes or cartons are tightly stacked onto the bed 19.

After completing the second tamping of the boxes or containers 24, the MCU 422 acts to lift the palletizer 14 through the tension members 250 by extending hydraulic cylinder 256 until the MCU 422 receives a signal from the eighth trip sensor 456 actuated by the wand 452 indicating that the palletizer false floor 262 level is above the level of the just assembled section of boxes or containers 24.

Upon receiving a signal from the wand actuated trip sensor 456, the MCU 422 stops the expansion of the hydraulic cylinder 256 and extends the false floor 262 as described herein.

In all cases it should be understood that the false floor 262 is retracted or extended by expansion or contraction, respectively, of hydraulic cylinder 288. Similarly, it should be understood that extension or retraction of the tamping bar 264 is accomplished by expansion or contraction, respectively, of hydraulic cylinder 300. The various hydraulic cylinders and motors used throughout the present device are controlled by opening or closing non-shown valves in the hydraulic lines. The not-shown master pump for the hydraulic system is driven by the truck engine.

As is shown in FIGS. 30, 36 and 39, a trip bar 472 is connected to the right side of the palletizer frame 254 near the carriage vertical support member 182. A thirteenth trip sensor 474 is connected to the carriage right side vertical support member 182 through a plate means 476. A fourteenth trip sensor 478 is similarly connected to the carriage right side vertical support member 182 near the transloader bed as shown in FIG. 20. When actuated by movement of the trip bar 472, the thirteenth and fourteenth trip sensors 474 and 478, respectively, signal the MCU 422 when the palletizer 14 is at its highest or lowest permitted vertical position, respectively.

As such, where, as hereinabove described, the palletizer is raised after assembling and depositing a section of boxes or cartons 24, the receipt by the MCU 422 of an electronic signal from the thirteenth trip sensor 474 indicates to the MCU 422 that this will be the last section of boxes or cartons to be stacked is this column.

After assembling the last full section of boxes or cartons 24 as hereinabove described, the MCU 422 acts to stop the elevator drive means 212 by closing the not shown hydraulic valve leading to the elevator hydraulic motor 210 after the preselected number of boxes in the last section have been lifted by the elevator means 12. For purposes of example, when the preferred embodiment is used with standard boxes or cartons of lettuce, a full section is comprised of nine boxes or cartons; five arranged longitudinally and four arranged transversely.

The MCU 422 knows when nine boxes or cartons 24 have been transported by tabulating the number of times the elevator trip switch 420 has been actuated after receiving the above-mentioned column-top signal from the thirteenth trip sensor 474, indicating that the palletizer is at its uppermost level. As such, the elevator start command generated by the third roller trip sensor 432 indicating that the transfer head 260 is clear of the elevator shaft is overridden and the elevator remains in its stopped condition.

After assembling and fully depositing the top section of boxes or containers 24, the lower carriage 152 moves longitudinally forward until the first roller trip sensor 178 is actuated by the pre-positioned trip plate 180. During this process, when the carriage has withdrawn from the assembled stack of boxes or cartons 24 such that pivoting wand 452 drops from the column of stacked sections of cartons or boxes 24 and actuates the eighth trip sensor 456, the MCU 422 acts to begin lowering the palletizer frame 252 by contacting hydraulic cylinder 256 until the palletizer trip plate 472 actuates the fourteenth trip sensor 478 located near the lower palletizer carriage frame 252 as hereinabove described.

Upon receiving a signal from the fourteenth trip sensor 478, the MCU 422 terminates the downward movement of the palletizer frame 252 since the palletizer frame is now in its bottom position. As is apparent from the foregoing, the vertical position of either or both the thirteenth trip sensor 474 or the fourteenth trip sensor 478 may be varied to provide greater flexibility in the stacking of boxes or containers 24 on the transloader bed 18 as hereinafter described.

Upon receiving the electronic signal from the fourteenth trip sensor 478, the MCU 422 extends the palletizer false floor 262 as hereinabove described, withdraws its override of the elevator control system, and begins its loading and stacking operations.

Longitudinal movement of the carriage 150 beyond its maximum forward position is prohibited by a fifteenth trip sensor 480 positioned on the truck as shown in FIG. 2. The fifteenth trip sensor 480 signals the MCU 422 when the carriage 252 is in the fully forward longitudinal position. The MCU 422 then disconnects the circuit that controls the valve which feeds the longitudinal carriage movement motor 176, thereby preventing further forward longitudinal movement of the carriage.

As is apparent from the disclosure contained herein, it will be seen that various stacking capabilities, illustrated in FIG. 57, are possible with the present invention. For example, the illustrations on the left side of the page containing FIGS. 57(a)-(d) show a variety of stacking arrangement which may be produced by the palletizer on the truck bed 18. The right side of the page illustrates how those stacks may be stored in a cooler for on loading to a rail car or a semi-trailer truck.

Figure 57A:
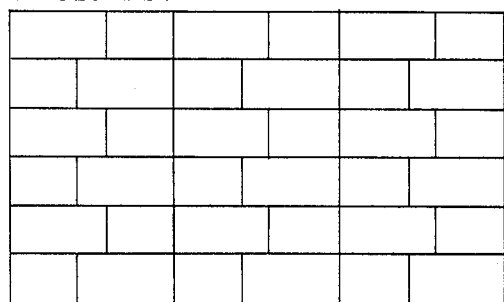
FIGS. 57(a)-(d) illustrate various carton stacking capabilities of the present device.
Figure 57A:
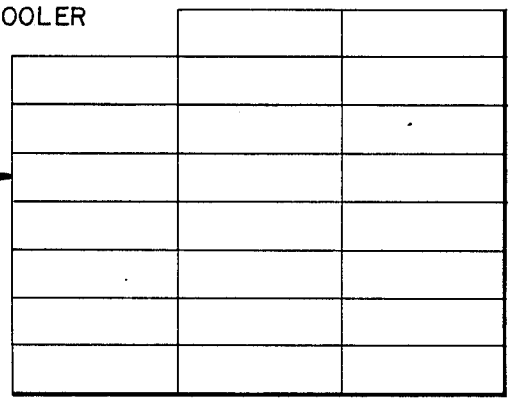
Figure 57B:
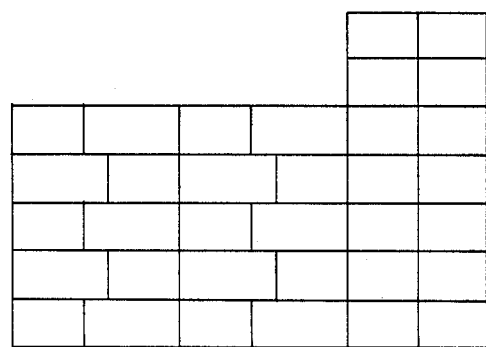
Figure 57B:
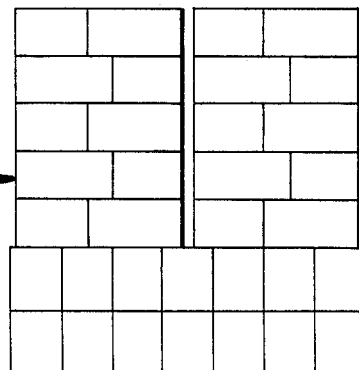
Figure 57C:
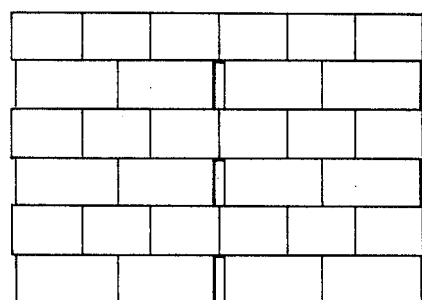
Figure 57C:
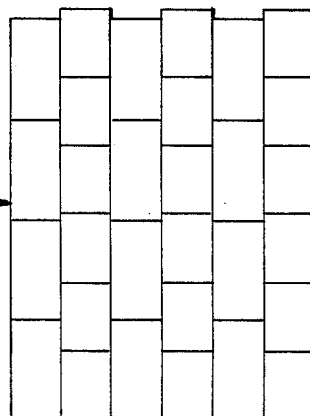
Figure 57D:
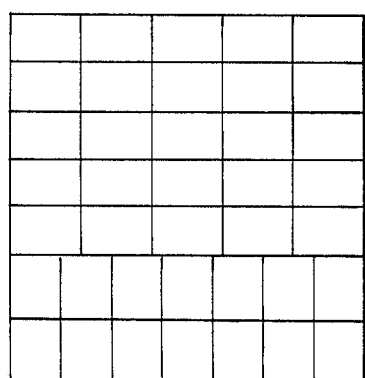
Figure 57D:
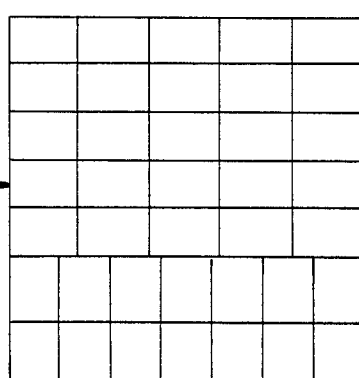
Figure 58:
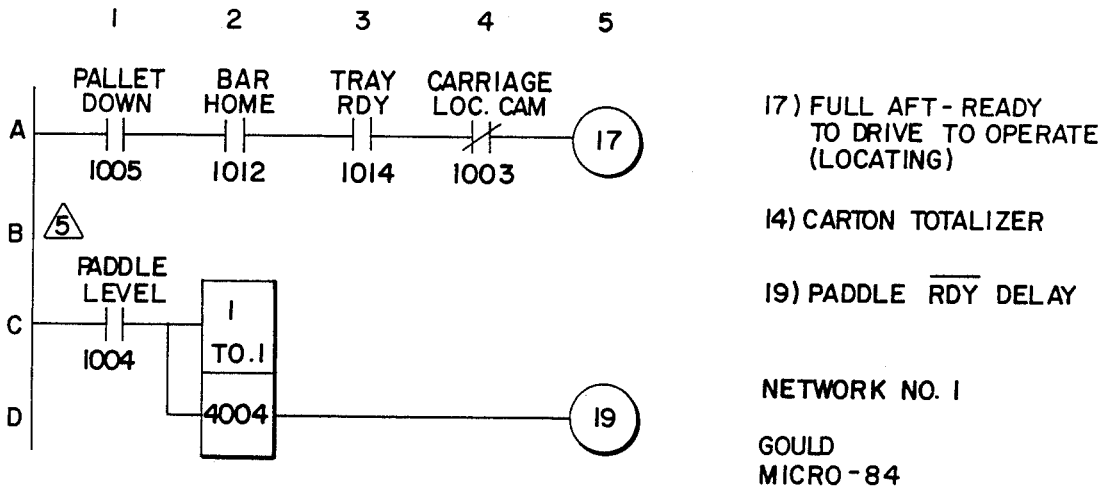
Figure 59:
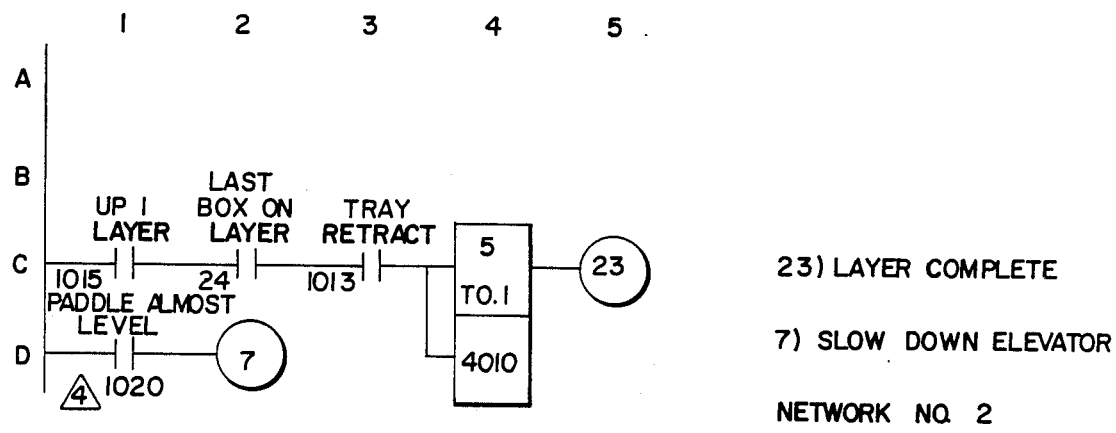
Figure 60:
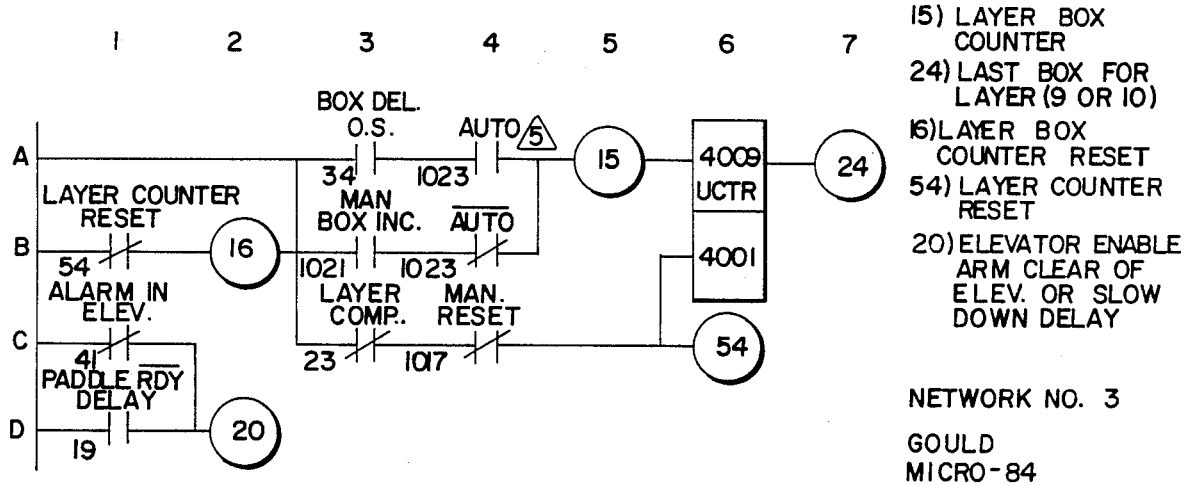
Figure 61:
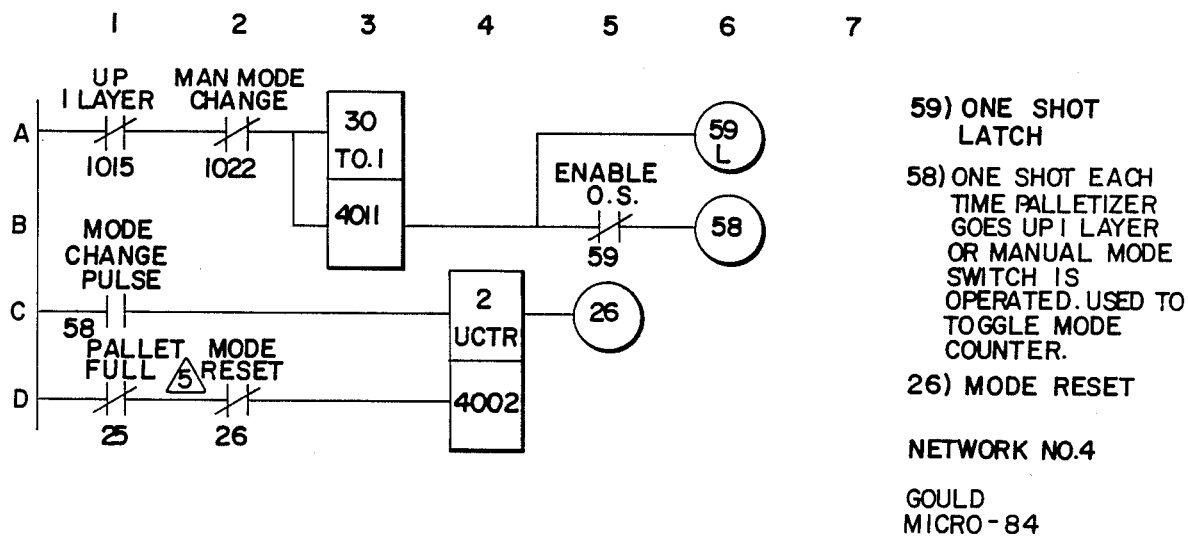
Figure 62:
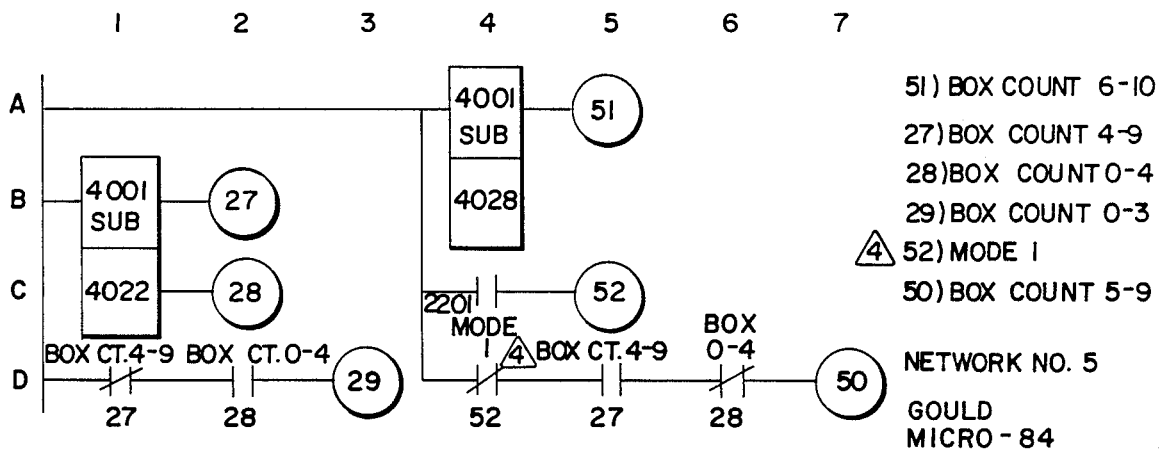
Figure 63:
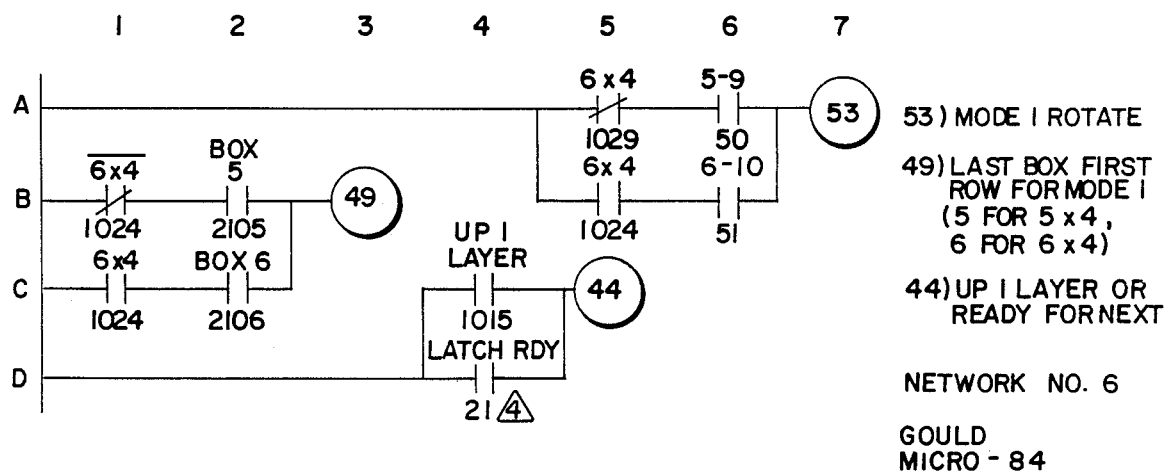
Figure 64:
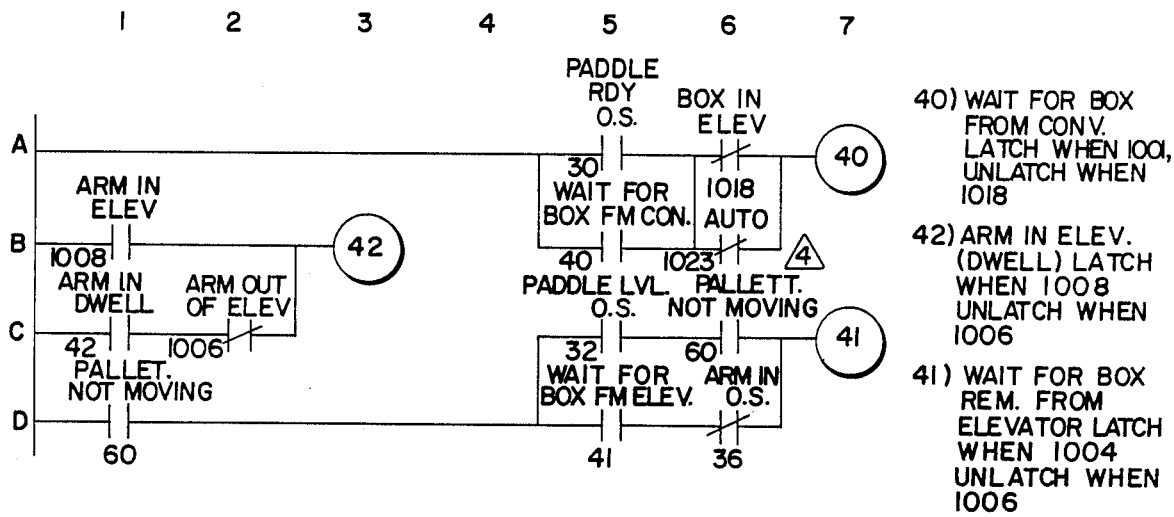
Figure 65:
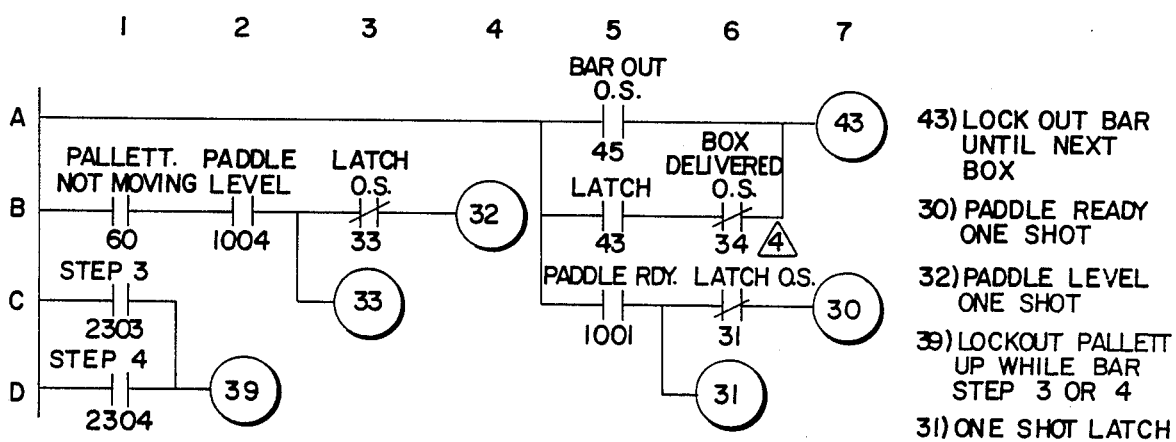
Figure 66:
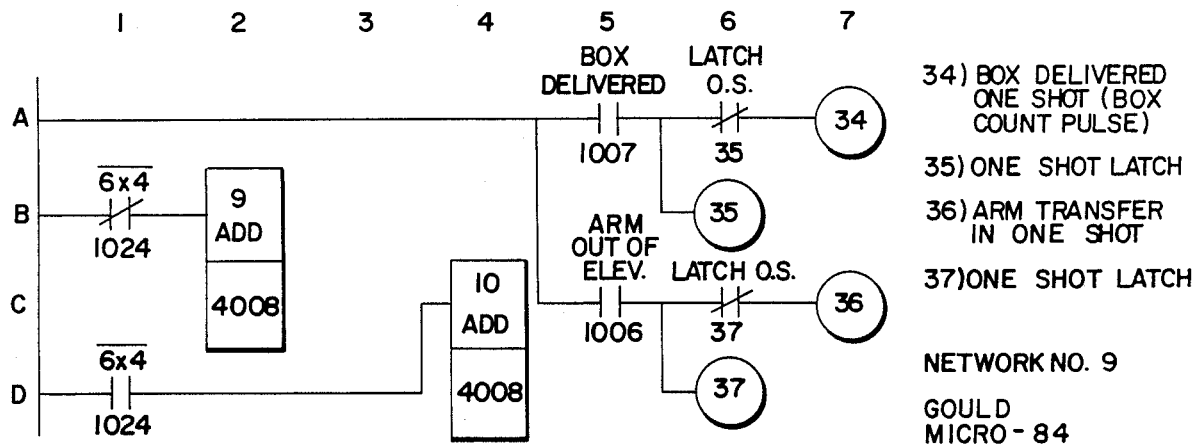
Figure 67:
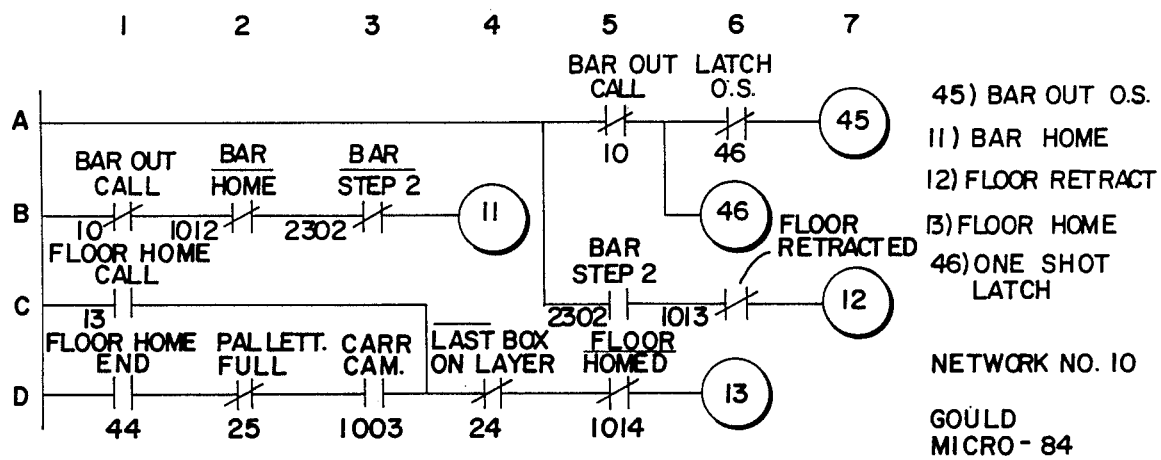
Figure 68:
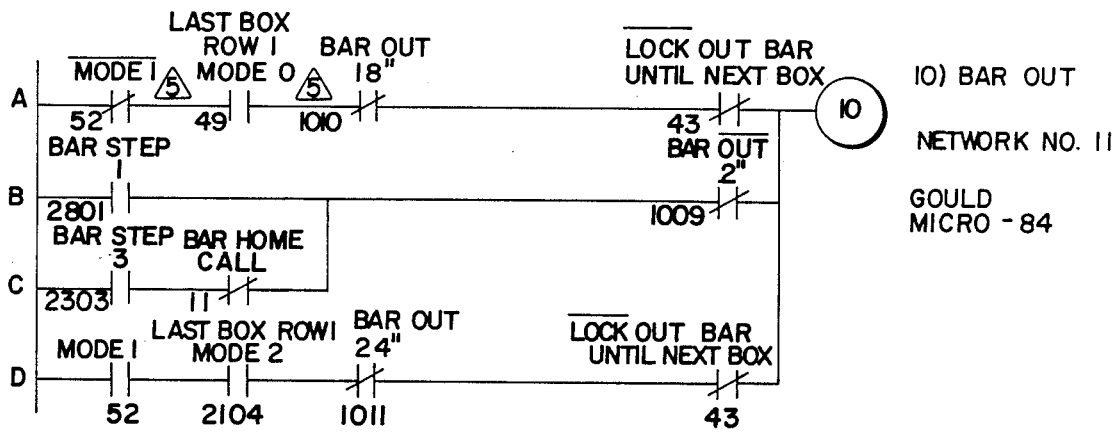
Figure 69:
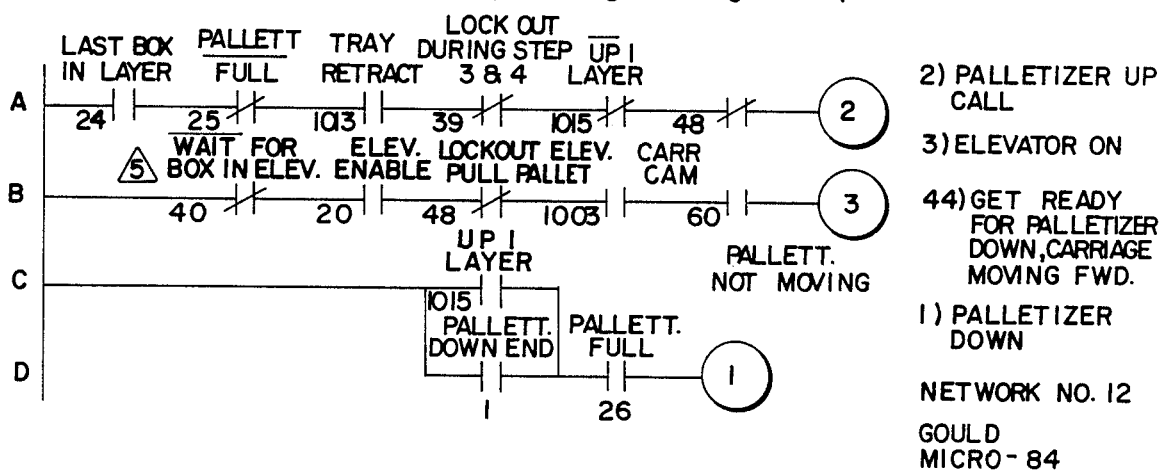
Figure 70:
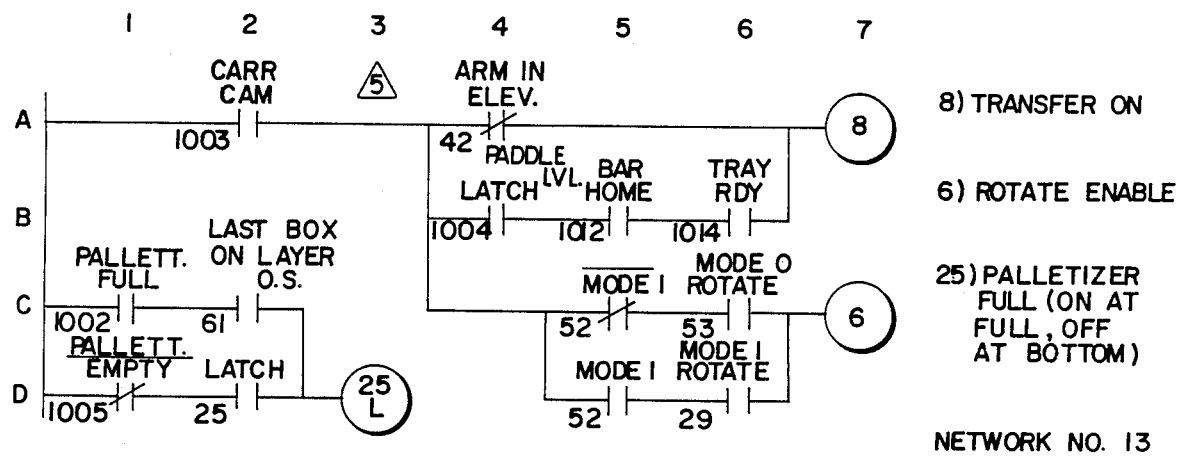
Figure 71:
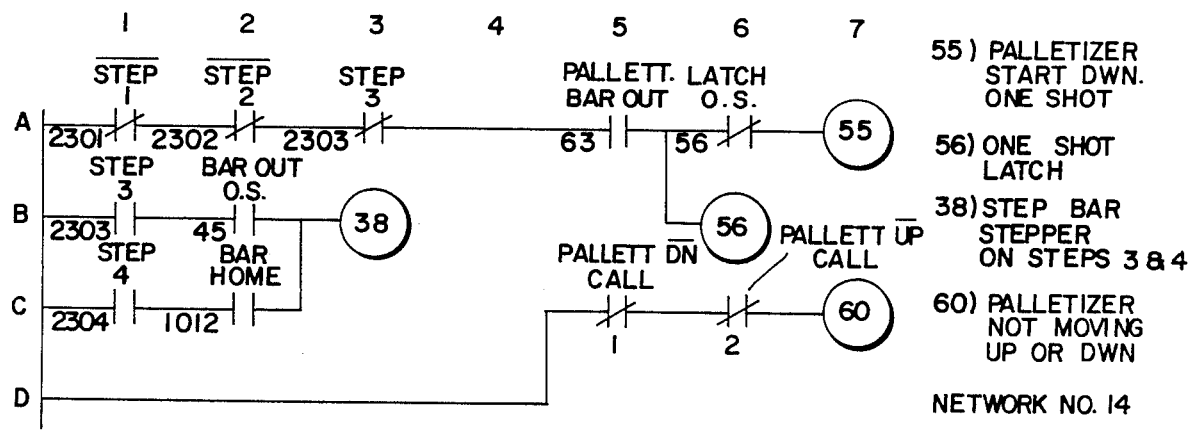
Figure 72:
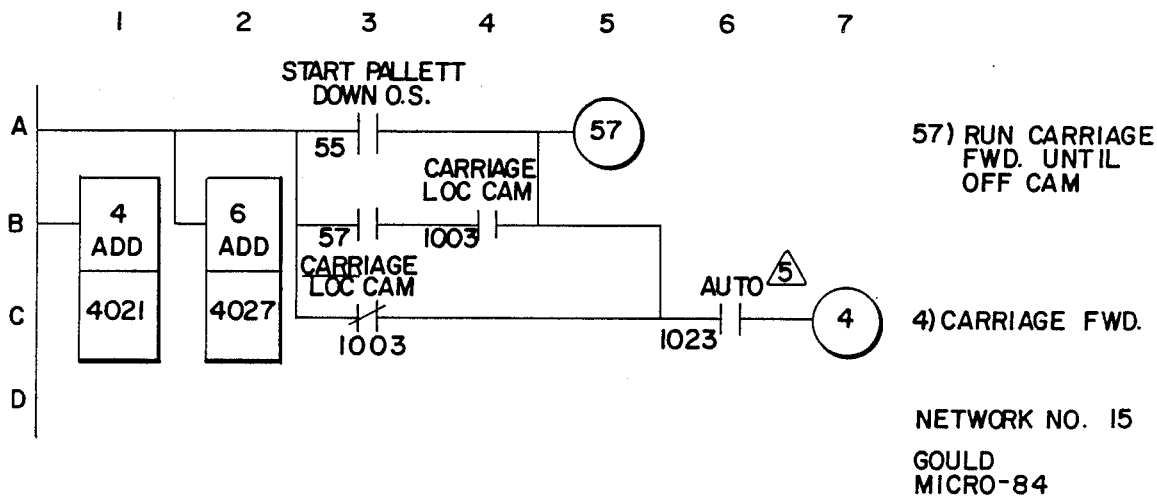
Figure 73:
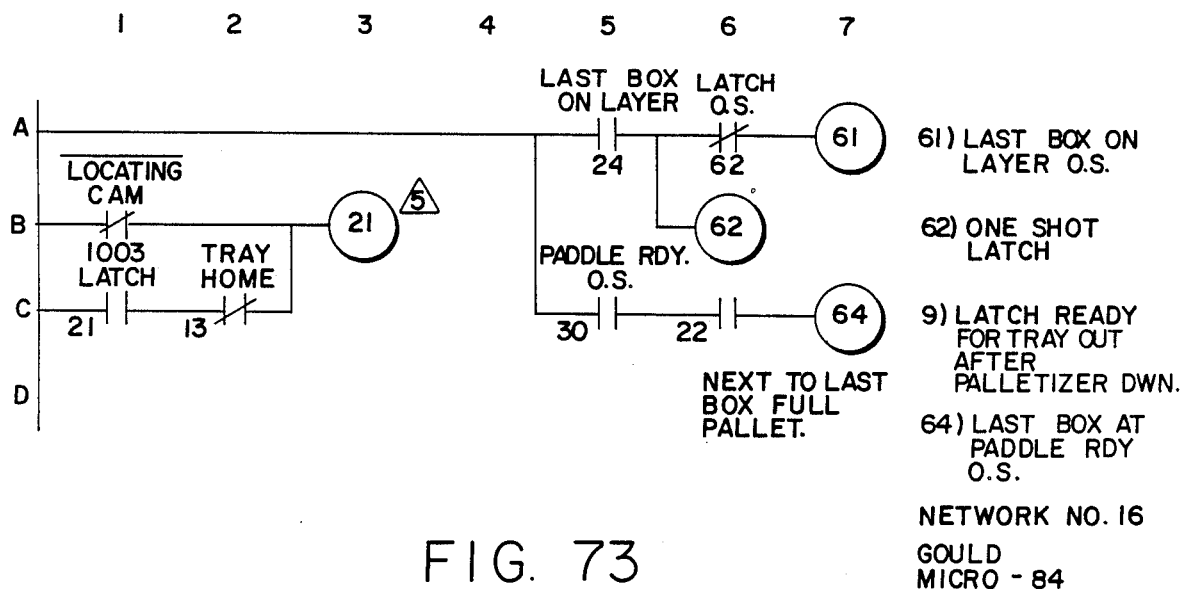
Figure 74:
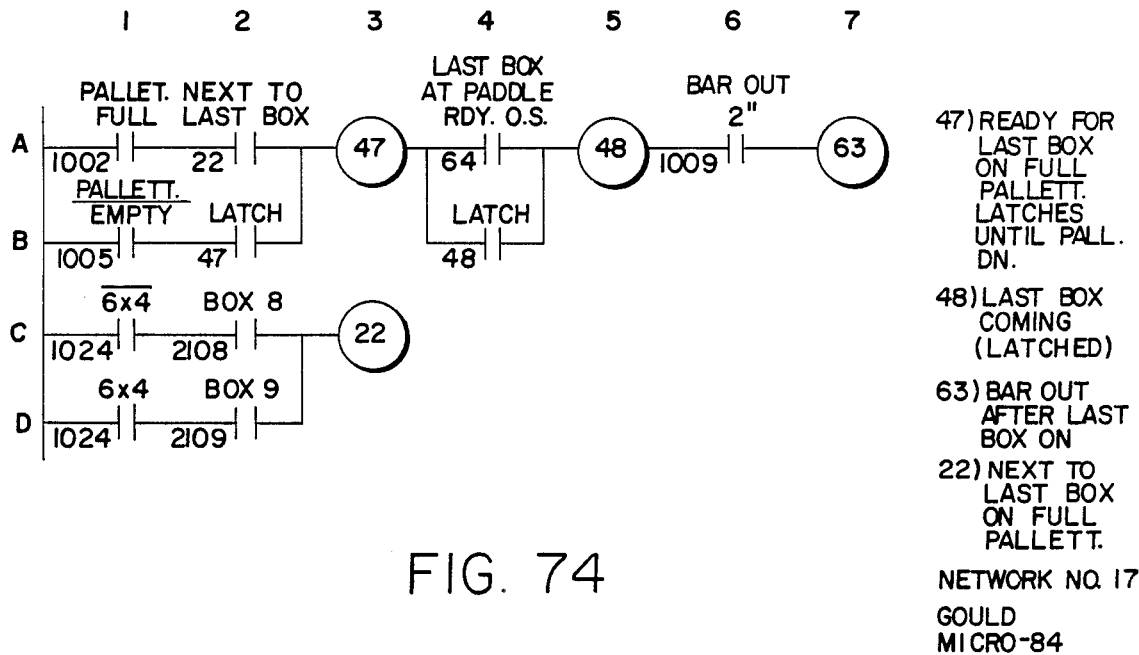
Figure 75:
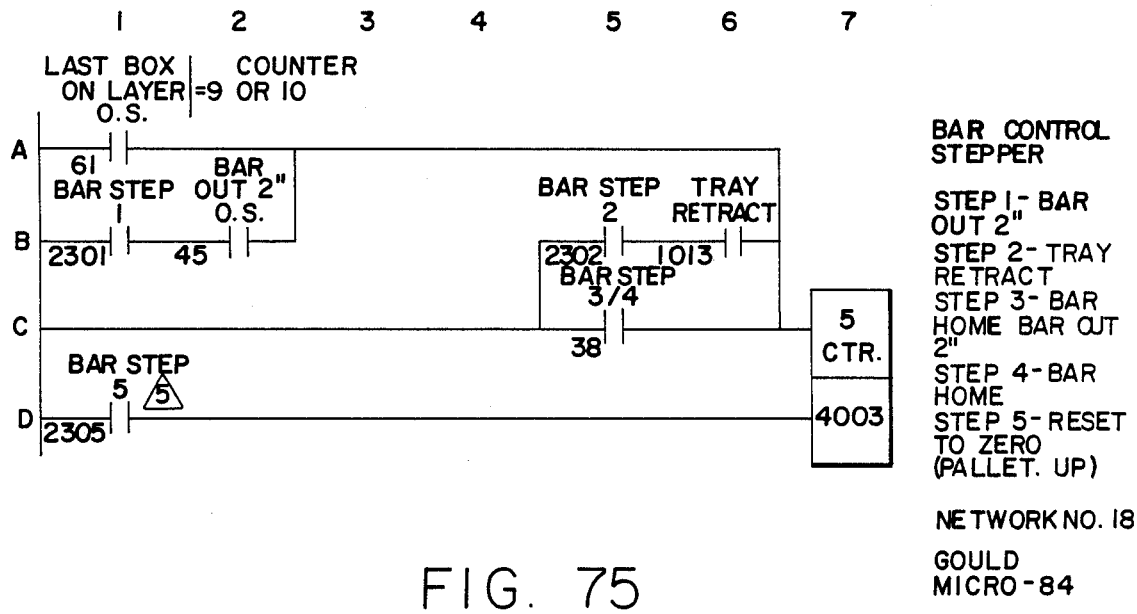

The stacking configurations shown on the left half of the page in FIGS. 57a-c, may be totally produced by the present device on the bed of the transloader. The configuration illustrated in FIG. 57d, however, requires that the bottom two rows be manually stacked on the transloader bed 18. By raising the level of the fourteenth trip sensor 478, it would be possible to assemble the five rows above the bottom two rows using the present device.

In the preferred embodiment of the present invention, the MCU 422 referenced herein is a Gould programmable controller, model "Micro-84", having the capability to incorporate 18 logic networks and six input/output modules. Such programmable controllers are commonly used in programmable machines such as lathes and the like. The microprocessor used herein monitors the input switches every 60 milliseconds in its execution of the programming steps. For purposes of illustration, FIGS. 58–80 illustrate the programming sequence used in the preferred embodiment.

Figure 14:
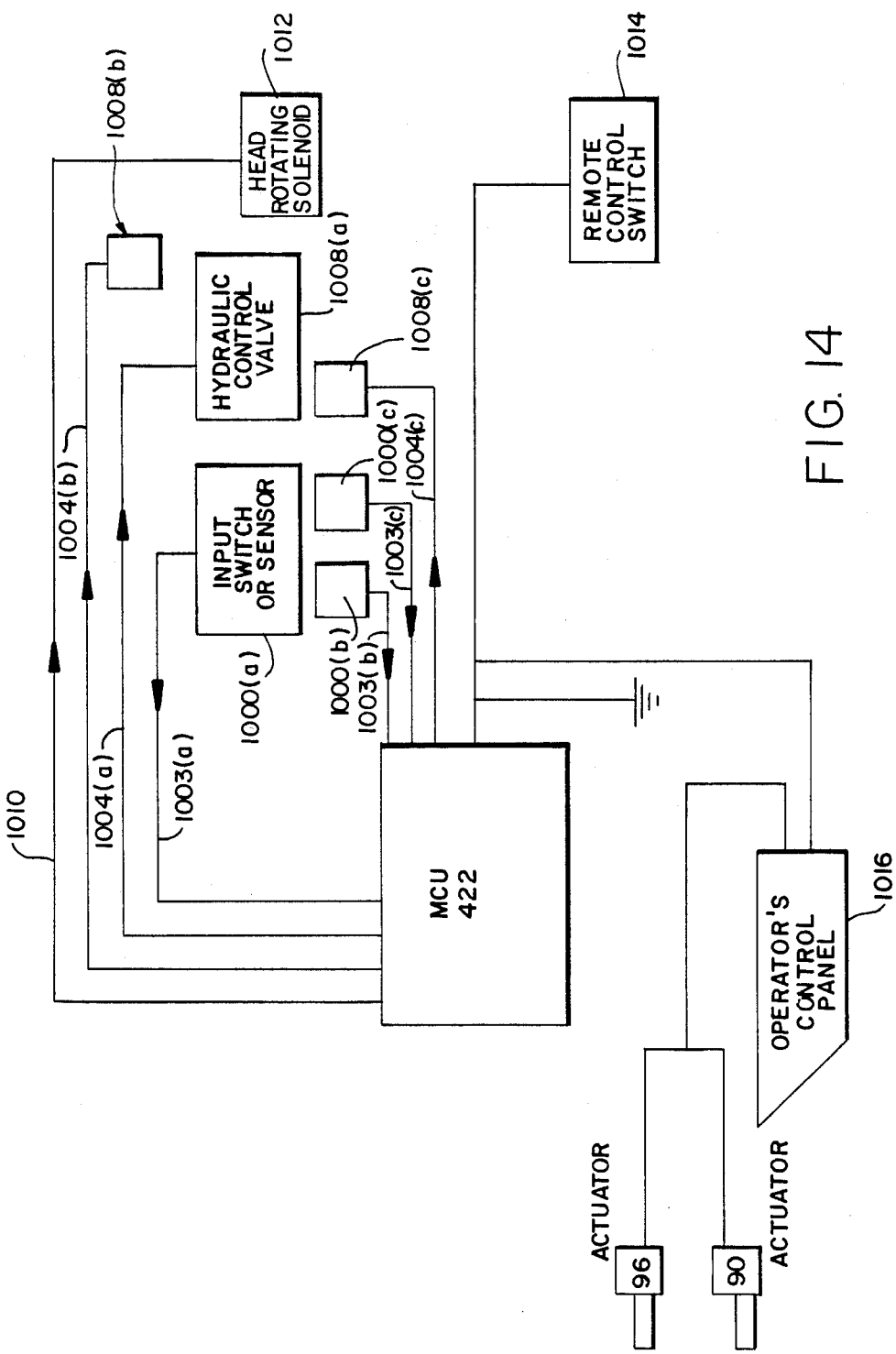
FIG. 14 is an electrical schematic diagram of the present device control apparatus.

As illustrated by the schematic diagram in FIG. 14, the various input trip sensors 1000(a)–1000(c) feed into input modules of the MCU 422 through sensor wires 1003(a)–1000(c). Similarly, a plurality of sensor wires 1004(a)–1004(b) feed from MCU output modules to each of the hydraulic valves 1008(a)–1008(c) used herein to control each of the within described hydraulic cylinders and motors. In addition, an output sensor wire 1010 extends from an MCU output module to the head rotating solenoid apparatus 1012.

It should be understood that each sensor or valve is independently connected to the MCU 422, through an input module or an output module.

A remote control switch 1014 positioned near the rear of the truck allows the truck operator to control the off loading functions hereinabove described from outside the cab so as to enable the operator to have a full and clear view of the operations transpiring. In addition, a full override of all the functions is provided through the MCU by the operator's control panel 1016 positioned with the cab.

As can be noted from FIGS. 14, the electronic screw actuators 90 and 96 which operate and position the front loader assembly are not controlled by the MCU 422.

The embodiments of the invention described hereinabove are intended for purposes of example only and should not be construed to limit the scope of the claims appended hereto.

We claim:

1. An apparatus for field loading a plurality of containers onto a transport vehicle including:
   (a) conveyor means having pickup and discharge means;
   (b) said pickup means including container engaging means for engaging and lifting said container from the field;
   (c) said conveyor discharge means including pivot means for mounting said discharge means on said vehicle;
   (d) said conveyor pickup means including vertically adjustable suspension means for raising and lowering said pickup means relative to said container lying in the field, including means for mounting said suspension means on said transport vehicle;
   (e) said container engaging means including a substantially inverted U-shaped frame including top and side members;
   (f) said side members each supporting a driveable conveyor;
   (g) said driveable conveyors being positioned in face-to-face relationship with each other and engageable as a pair with opposite sides of said container lying in the field for picking up said container and conveying said container to said discharge means when said driveable conveyors are being driven;
   (h) means mounted in said frame for limiting the upward movement of said container when picked up by said driveable conveyors from the field; and
   (i) said driveable conveyors each being positioned approximate the ends of said inverted U-shaped frame side members.

2. An apparatus as in claim 1, and including:
   (a) container alignment means operably associated with said pick up means for aligning said container to be picked up from the field with said pick up means.

3. An apparatus as in claim 1, and including:
   (a) means for automatically adjusting the width of said pick up means to accommodate slight variation in the sizes of said container.

4. An apparatus as in claim 3, wherein:
   (a) one of said side members is pivotable relative to said other side member; and
   (b) said pivotable side members include tension means for biasing said pivotable side member toward said other side member.

5. An apparatus as in claim 1, and including:
   (a) drive means mounted on said inverted U-shaped frame and extending across said top member of said frame for driving said driveable conveyors.

6. An apparatus as in claim 1, wherein:
   (a) said suspension means includes at least a pair of tension members.

7. An apparatus as in claim 6, wherein:
   (a) said suspension means includes harness hanger means for laterally moving said inverted U-shaped frame to compensate for variation in the position of said containers in the field.

8. An apparatus as in claim 7, wherein:
   (a) said harness hanger means includes self-centering means for automatically returning said inverted U-shaped frame into a center position after being moved laterally.

9. An apparatus as in claim 1, wherein:
   (a) said discharge means includes a conveyor.

10. An apparatus as in claim 9, wherein:
    (a) at least a portion of said discharge means conveyor is disposed below said driveable conveyors of said pick up means.

11. An apparatus as in claim 10, wherein:
    (a) said driveable conveyors are disposed at an angle relative to the horizontal greater than the angle of said discharge means conveyor relative to the horizontal.

12. An apparatus as in claim 11, wherein:
    (a) said discharge means includes means for supporting said pick up means above said discharge means.

13. An apparatus as in claim 1, wherein:
    (a) said driveable conveyors include friction material disposed thereon.

14. An apparatus as in claim 7, and including:
    (a) remote controller means for effecting the vertical and lateral movements of said pickup means from a remote location.

15. An apparatus as in claim 1, and including:
    (a) palletizer means disposed on said transport vehicle and operably associated with said conveyor discharge means for stacking said containers onto said transport vehicle.

16. An apparatus as in claim 15, wherein:
    (a) said palletizer means includes an elevator means for conveying and elevating to a preselected height said containers discharging from said discharge means.

17. An apparatus as in claim 16, wherein:
    (a) said elevator means includes means for orienting said containers for stacking in a preselected configuration.

18. An apparatus as in claim 17, wherein:
    (a) said palletizer means includes means to determine the number of containers stacked on said transport vehicle.

19. An apparatus as in claim 18, wherein:
    (a) said palletizer means is interactively controlled through a micro-processor.

20. An apparatus as in claim 15, and including:
    (a) means for transferring said stacked containers from said transport vehicle to another transport vehicle.

21. An apparatus as in claim 15, wherein:
    (a) said palletizer means is attached to a bed frame.

22. An apparatus as in claim 21, wherein:
    (a) said bed frame includes a bed having roller means for facilitating movement of said stacked containers on said transport vehicle.

23. An apparatus as in claim 22, wherein:
    (a) said bed includes tailgate means for providing a stop for said stacked containers when said tailgate means is closed.

* * * * *